(12) United States Patent
Witelson et al.

(10) Patent No.: US 10,300,412 B2
(45) Date of Patent: May 28, 2019

(54) POOL CLEANER WITH FILTER WITH SELF CLEANING MEANS AND HIGH INTERNAL PRESSURE

(71) Applicant: MAYTRONICS LTD., Kibutz Yizrael (IL)

(72) Inventors: Shay Witelson, Yizrael (IL); Oded Golan, Kefar Tavor (IL)

(73) Assignee: MAYTRONICS LTD., Kibutz Yisrael (IL)

( * ) Notice: Subject to any disclaimer, the term of this patent is extended or adjusted under 35 U.S.C. 154(b) by 638 days.

(21) Appl. No.: 14/829,668

(22) Filed: Aug. 19, 2015

(65) Prior Publication Data

US 2016/0051913 A1 Feb. 25, 2016

Related U.S. Application Data

(60) Provisional application No. 62/038,883, filed on Aug. 19, 2014.

(51) Int. Cl.
| | |
|---|---|
| *B25J 5/00* | (2006.01) |
| *B25J 9/16* | (2006.01) |
| *C02F 1/00* | (2006.01) |
| *E04H 4/16* | (2006.01) |
| *B01D 29/23* | (2006.01) |

(Continued)

(52) U.S. Cl.
CPC ......... *B01D 29/6415* (2013.01); *B01D 29/23* (2013.01); *B01D 29/60* (2013.01); *B01D 33/11* (2013.01); *B01D 33/461* (2013.01); *B01D 33/804* (2013.01); *B25J 5/00* (2013.01); *B25J 9/1694* (2013.01); *B25J 11/0085* (2013.01); *C02F 1/001* (2013.01); *E04H 4/1654* (2013.01); *C02F 2103/42* (2013.01); *C02F 2201/008* (2013.01); *Y10S 901/01* (2013.01)

(58) Field of Classification Search
CPC .. B01D 29/6415; B01D 33/461; B01D 29/60; B01D 33/804; B01D 33/11; B01D 29/23; B25J 11/0085; B25J 9/1694; B25J 5/00; C02F 1/001; C02F 2103/42; C02F 2201/008; E04H 4/1654; E04H 4/12; E04H 4/1209; Y10S 901/01
USPC ................... 15/1.7; 210/167.16, 167.17, 143
See application file for complete search history.

(56) References Cited

U.S. PATENT DOCUMENTS

| | | | |
|---|---|---|---|
| 2011/0000036 A1* | 1/2011 | Pichon | E04H 4/1654 15/1.7 |
| 2013/0032527 A1 | 2/2013 | Calleri | |

(Continued)

FOREIGN PATENT DOCUMENTS

| | | | | |
|---|---|---|---|---|
| FR | 2742351 | 6/1997 | | |
| GB | 2337948 | 12/1999 | | |
| WO | WO-2014097304 A1 * | 6/2014 | | H02K 7/1823 |

OTHER PUBLICATIONS

EP search report of EP15181580 dated Dec. 11, 2015.

*Primary Examiner* — David C Mellon
(74) *Attorney, Agent, or Firm* — Reches Patents

(57) ABSTRACT

A pool cleaner that may include a drive mechanism for moving the pool cleaner; a housing that has a first fluid opening and a second fluid opening; a filtering unit that comprises a filter enclosure, a cleaning element and a filtering element; and a rotating mechanism that is configured to introduce a relative rotation between the cleaning element and the filtering element thereby causing the cleaning element to clean the filtering element.

35 Claims, 18 Drawing Sheets

(51) Int. Cl.
  *B01D 29/60* (2006.01)
  *B01D 29/64* (2006.01)
  *B01D 33/11* (2006.01)
  *B01D 33/46* (2006.01)
  *B01D 33/80* (2006.01)
  *B25J 11/00* (2006.01)
  *C02F 103/42* (2006.01)

(56) References Cited

U.S. PATENT DOCUMENTS

2013/0152317 A1\* 6/2013 Erlich .................. B08B 9/08
  15/1.7
2014/0076789 A1\* 3/2014 Shlomi-Shlomi ..... E04H 4/1654
  210/195.1

\* cited by examiner

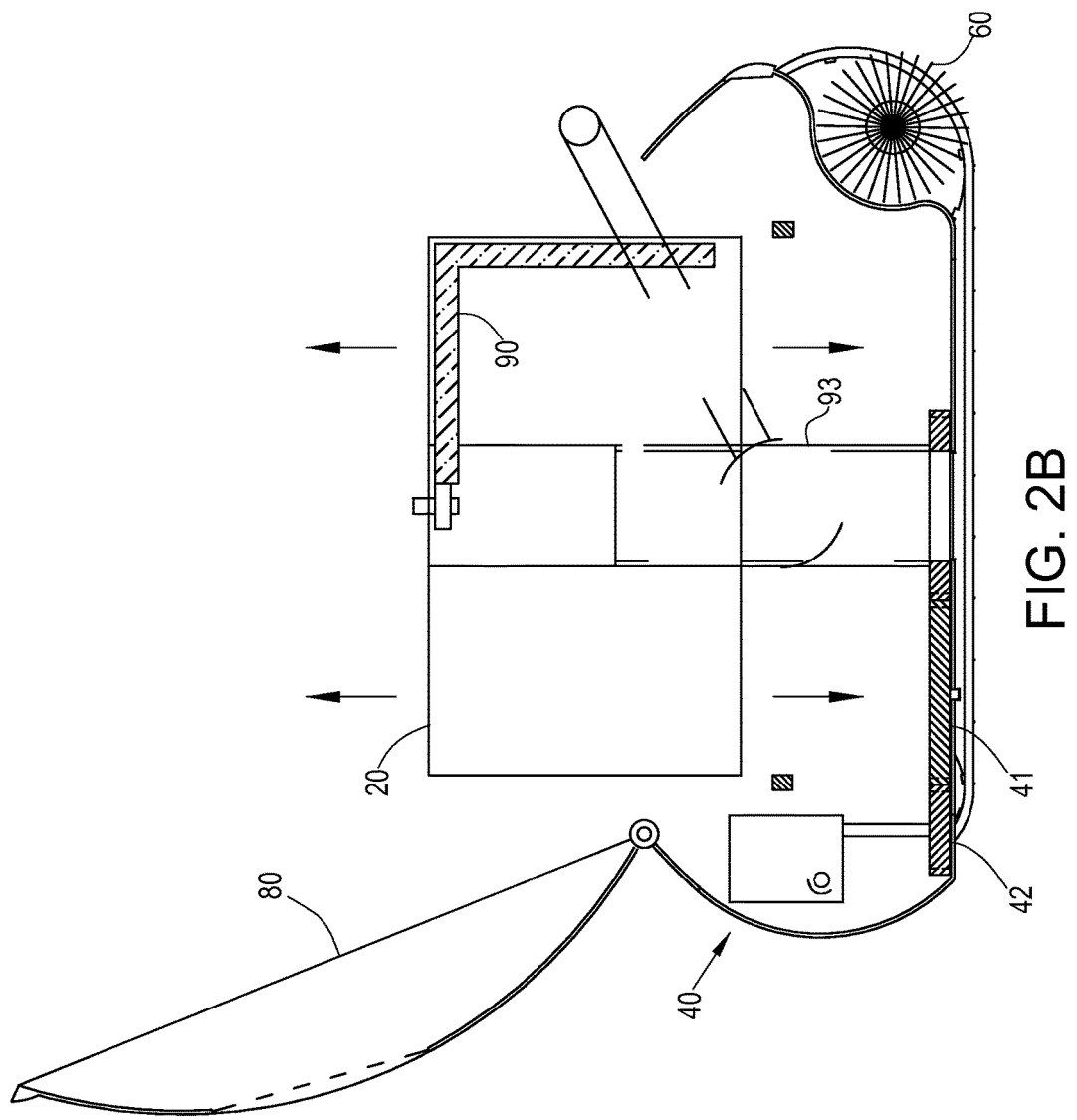

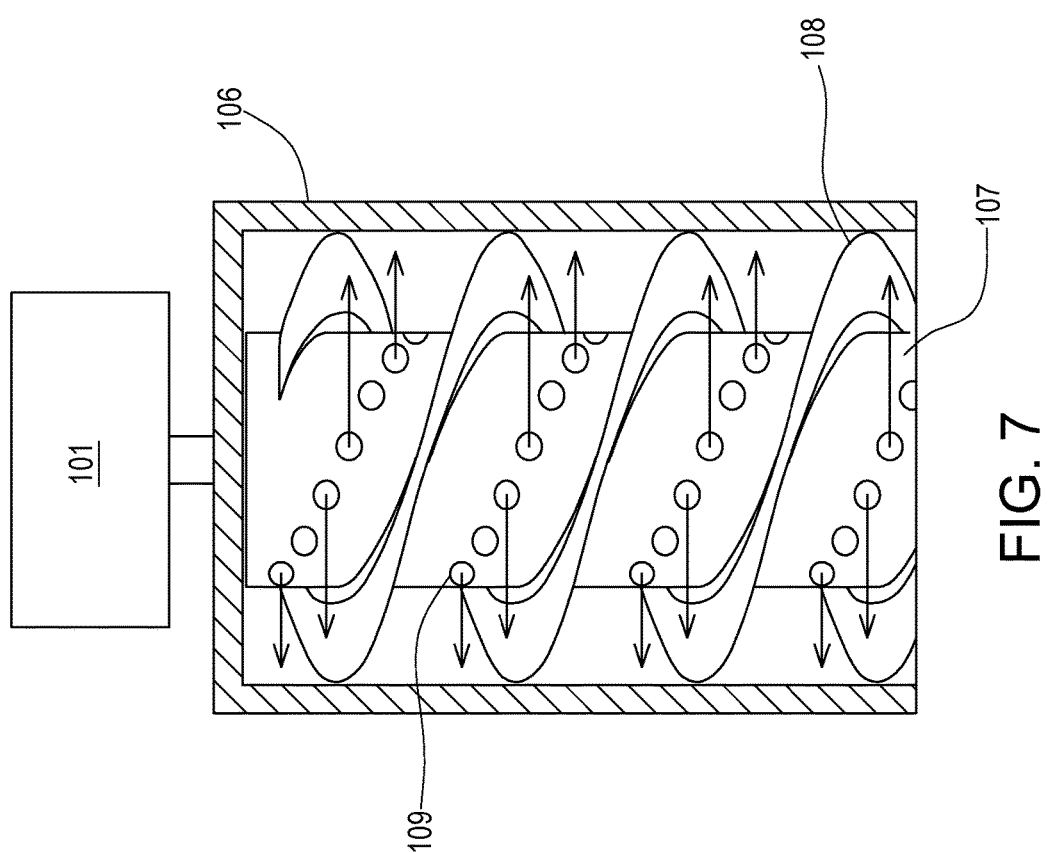

POOL CLEANER WITH FILTER WITH SELF CLEANING MEANS AND HIGH INTERNAL PRESSURE

REFERENCE TO RELATED APPLICATIONS

This application claims priority from U.S. provisional patent Ser. No. 62/038,883 dated Aug. 19, 2014, which is incorporated herein by its entirety.

BACKGROUND

Pool Cleaners commonly comprise of an enclosed hollow body that travels on wheels or tracks on the relative horizontal swimming pool surfaces; at least one brush to sweep the surfaces; at least two motors one of which drives the body on floor or walls; a pump motor that is positioned in a hydraulic system that draws water and debris from a bottom inlet opening in the said body where the said inlet is near or close to the travelled surfaces; said liquid passes through a filtering media and is subsequently ejected from the body from an upper positioned outlet opening.

The drawing through the bottom end of the body and the expelling of the water at the top end creates a negative pressure force at the bottom end to maintain the vehicle in contact with the underwater surface. Such a hydraulic system makes use of the suction port at the lower end of the body that also forms a negative pressure inside the body of the pool cleaner also called a vacuum pressure force.

The vacuum pressure force at the bottom of the pool cleaner coupled with the downward pressure created by the ejecting water that is being created will ensure that the pool cleaner remains in close contact to the floor or walls of the swimming pool.

The art depicts and describes numerous embodiments where said impeller pump motor is positioned—in an upright position or in an angled position—having impeller blades located remotely from of the pool cleaner inlet usually at a higher region within the hydraulic system path in the hollow body. The effect is an impeller pump that by means of the high-speed rotation of its plastic or non-rust metal made blades (at about 2600-3000 rpm) draws the water with sufficient force to pull the water through the filtering mechanism.

Such a hydraulic suction system is effective but has drawbacks:
a. The hollow body is never quite sealed from the surrounding pool water. The vacuum or negative internal pressure that is created and described above also draws unclean water from various openings in the pool cleaner body contour (wheel or brush areas, handle arrangements, venting/mechanical non-return valve elements etc.). This also causes air to be drawn into the hollow body, especially when climbing on the pool wall at waterline level. The vacuum and the suction force may thereby be reduced, at times, causing the pool cleaner to disengage from the waterline and to float uncontrollably on the water surface.
b. It is necessary to employ a pump motor with propeller or impeller blades that have sharp edges and that are revolving at a very high speed. The propeller/impeller is potentially accessible to fingers or other objects through the inlets or outlets of the pool cleaner so that an incautious end user may insert a finger that will contact the sharp blades.
c. The common upward position of the pump/impeller motor creates a high center of gravity. This is particularly problematic when in a climbing position on the pool wall where a high moment of force for wall disengagement is created by the pump motor location.
d. In the hydraulic water path movement, the position of the impeller blades must be after the filtering mechanism in the hydraulic water flow path so that only filtered water will impact the revolving impeller blades. Any changes in this configuration i.e.: impeller blades before filtering element may cause blade breakage/dent that will reduce pump efficiency.
e. The removal of the impeller/propeller from the upper area of the internal hollow body creates a space for introduction of a water outlet cylinder that will counteract revolving filer unit rotation torque forces with a water outlet spiral mechanism.

SUMMARY

According to an embodiment of the invention there may be provided a pool cleaner with self cleaning filter mechanism and a high internal hydraulic system pressure as illustrated in the figures and specification.

According to an embodiment of the invention there may be provided a pool cleaner that may include a drive mechanism for moving the pool cleaner; a housing that has a first fluid opening and a second fluid opening; a filtering unit that may include a filter enclosure, a cleaning element and a filtering element; and a rotating mechanism that may be configured to introduce a relative rotation between the cleaning element and the filtering element thereby causing the cleaning element to clean the filtering element. The relative motion may be performed by moving only the filtering element, only the cleaning element, by moving both the filtering element and the cleaning element at the same time and/or by moving both the filtering element and the cleaning element at partially overlapping or non-overlapping time periods. The movement of the filtering element can be performed by moving the filtering element itself or by moving any element (such as but not limited to a filter enclosure) that is mechanically coupled to the filtering element. The movement of the cleaning element can be performed by moving the cleaning element itself or by moving any element (such as but not limited to a supporting element) that is mechanically coupled to the filtering element.

The pool cleaner may include a set of impeller blades that may include at least one impeller blade; wherein the rotation of the filtering element causes the set of impeller blades to rotate thereby inducing fluid to enter through the first fluid opening.

The pool cleaner may not include any impeller except the set of impeller blades.

The filter enclosure may include a filtering unit gear that meshes with the rotating mechanism; wherein the filtering unit gear is located in proximity to a bottom of the filter enclosure.

The filter enclosure may include a filtering unit gear that meshes with the rotating mechanism; wherein the filtering unit gear is located above an upper surface of the filter enclosure.

The cleaning element is coupled to a movement element that may be configured to rotate an interfacing portion of the cleaning element; wherein the interfacing portion may be configured to interface with an inner section of the filtering element during a cleaning of the inner section of the filtering element.

The movement element may be configured to rotate the interfacing portion of the cleaning element about an axis that is closer to a sidewall of the filtering element than to a center of the cleaning element.

The movement element may be configured to rotate the interfacing portion of the cleaning element about an axis that is proximate to a sidewall of the filtering element.

The movement element may be configured to rotate the interfacing portion of the cleaning element about an axis; wherein at least an upper portion of the axis is positioned above the filtering element; wherein the filtering element defines a gap that is at least partially sealed by a sealing element; wherein the axis passes through the sealing element.

The sealing element has an annular shape.

The interfacing portion is connected to an arm; wherein the interfacing portion is supported by the arm.

The movement element belongs to the rotating mechanism.

The movement element is mechanically coupled to the rotating mechanism.

The movement element is positioned within the filter enclosure.

The movement element is positioned outside the filter enclosure.

The cleaning element may include a vertical portion that interfaces with a sidewall of the filtering element.

The cleaning element is positioned at a fixed position during a cleaning of the inner section of the filtering element.

The cleaning element may include an interfacing portion for interfacing with an inner section of the filtering element, wherein the interfacing portion is coupled to a movement element that may be configured to move the interfacing portion in relation to the cleaning element thereby changing a distance between the interfacing portion and the filtering element.

The cleaning element may include an interfacing portion that is coupled to a movement element; wherein the movement element may be configured to move the interfacing portion between a first position in which the interfacing element interfaces with an inner section of the filtering element and a second position in which the interfacing element is spaced apart from the inner section of the filtering element.

The pool cleaner that may include multiple filtering elements and multiple cleaning elements for cleaning the multiple filtering elements.

The pool cleaner wherein a spatial relationship between at least a pair of cleaning elements remains unchanged.

The cleaning element may include an arm that may include a supporting element and an interfacing portion; wherein the interfacing portion may be configured to interface the inner section of the filtering element when cleaning the filtering element.

The cleaning element may include a rod and alternating fins that are connected to the rod; wherein the rod may be configured to rotate about a longitudinal axis of the rod when cleaning the filtering element.

The cleaning element may include a brush that is parallel to a sidewall of the filtering element.

The cleaning element may include a brush that is oriented in relation to a sidewall of the filtering element.

The cleaning element may include a brush that may be configured to interface with a sidewall and a bottom of the filtering element.

The filtering unit is radially symmetrical and wherein the first fluid opening is positioned at a center of the filtering unit.

The pool cleaner may include a hydraulic system that may be configured to direct fluid from the first fluid opening towards the second fluid opening; wherein the rotating mechanism and the hydraulic system share a motor.

The pool cleaner, wherein the cleaning element may include a cleaning element core and an interfacing portion that extends from the cleaning element core and interfaces with the filtering element; wherein the cleaning element core may include multiple cleaning element core apertures; wherein the filtering element may be configured to filter fluid that enters via the first fluid opening, passes through the multiple cleaning element core apertures and exits through the second fluid opening; and wherein the rotating mechanism may be configured to rotate the cleaning element core.

The rotating mechanism may be configured to simultaneously rotate the filtering element and the cleaning element core.

The rotating mechanism may be configured to rotate the filtering element and the cleaning element core in a mutual independent manner.

The interfacing portion may include multiple bristles.

The multiple bristles are positioned along a spiral path.

The interfacing portion may include a continuous spiral element.

The interfacing portion may include a non-continuous spiral element.

According to an embodiment of the invention there may be provided a pool cleaner that may include a drive mechanism for moving the pool cleaner; a housing that has a first fluid opening and a second fluid opening; a filtering unit that may include a filter enclosure, a filtering element, an apertured filter core; and a cleaning element for cleaning the filtering element; wherein the cleaning element may include an interfacing portion that interfaces with the filtering element; a rotating mechanism that may be configured to rotate the filter enclosure; and a movement mechanism that may be configured to rotate the apertured filter core.

The rotating mechanism may be configured to rotate the filter enclosure regardless of the rotation of the apertured filter core.

The pool cleaner further may include a set of impeller blades that may include at least one impeller blade.

The set of impeller blades are mechanically coupled to the filter enclosure.

The set of impellers is mechanically coupled to the apertured filter core.

The pool cleaner that may include multiple filtering elements and multiple cleaning elements for cleaning the multiple filtering elements.

The pool cleaner wherein a spatial relationship between at least a pair of cleaning elements maintains unchanged According to an embodiment of the invention there may be provided a pool cleaner that may include a drive mechanism for moving the pool cleaner; a housing that has a first fluid opening and a second fluid opening; a filtering unit that may include a filter enclosure and a filtering element and a cleaning element for cleaning the filtering element; a debris trap; wherein the debris trap and the filtering element are fluidly coupled to each other by a uni-directional flow element that facilitate a flow of debris from the filtering element to the debris trap and prevents a flow of debris from the debris trap to the filtering element.

The pool cleaner may include a cleaning element and a rotating mechanism that may be configured to rotate the filter enclosure, thereby causing the cleaning element to clean an inner section of the filtering element.

The uni-directional flow element is closer to a sidewall of the filtering element than to an axis of rotation of the filtering element.

The cleaning element is positioned within the filter enclosure.

The cleaning element may be configured to constantly clean the filtering element.

The cleaning element may be configured to clean the filtering element in a non-continuous manner.

The pool cleaner may include a sensor for sensing when the filtering element is clogged to a predefined level and to trigger a cleaning of the filtering element by the cleaning element.

The pool cleaner may include a sensor for sensing when the filtering element is clogged to a predefined level and to trigger a mode of receiving a flow of debris from the filtering element to the debris trap.

The pool cleaner may include a sensor for sensing when the filtering element is clogged to a predefined level and to trigger a simultaneous cleaning of the filtering element by the cleaning element and a mode of receiving a flow of debris from the filtering element to the debris trap.

The pool cleaner may include multiple uni-directional flow elements.

The uni-directional flow element is a uni-directional valve.

The debris trap has elastic sidewalls that are configured to expand when the debris trap rotates.

The debris trap may be configured to expand when receiving the debris and to contract when not receiving the debris.

BRIEF DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

FIG. 2B is a cross sectional view of a pool cleaner according to an embodiment of the invention;

FIG. 7 is a cross sectional view of a filtering unit that includes a cleaning element and movement element according to an embodiment of the invention;

DETAILED DESCRIPTION OF THE DRAWINGS

Figure 1:
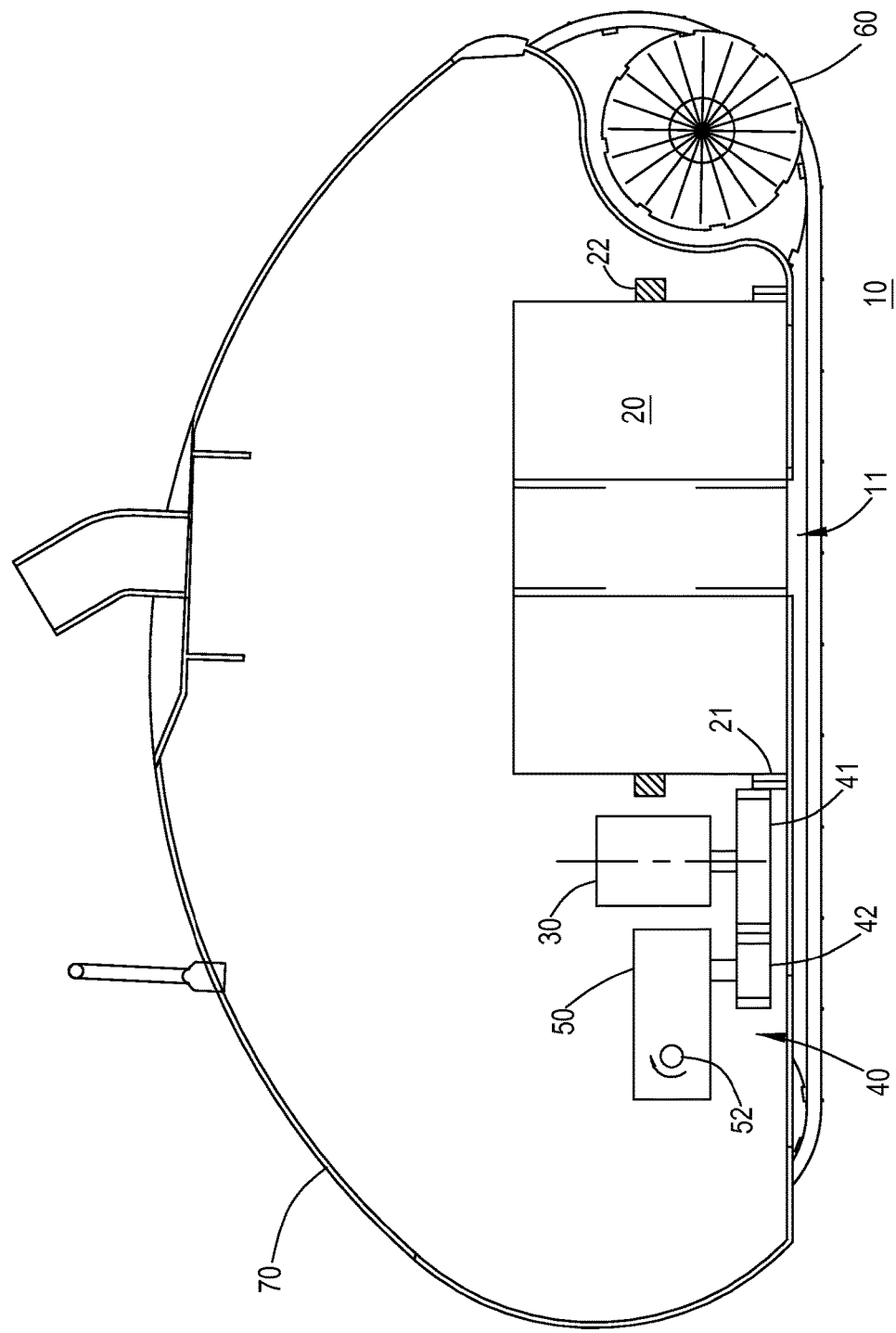
FIG. 1 is a cross sectional view of a pool cleaner according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terms "spindle", "axis" and "axe;" are used in an interchangeable manner.

The terms "system", "unit", "mechanism" and "arrangement" are used in an interchangeable manner.

The term "comprising" is synonymous with (means the same thing as) "including," "containing" or "having" and is inclusive or open-ended and does not exclude additional, unrecited elements or method steps.

The term "consisting" is a closed (only includes exactly what is stated) and excludes any additional, unrecited elements or method steps.

The term "consisting essentially of" limits the scope to specified materials or steps and those that do not materially affect the basic and novel characteristics.

In the claims and specification any reference to the term "comprising" (or "including" or "containing") should be applied mutatis mutandis to the term "consisting" and should be applied mutatis mutandis to the phrase "consisting essentially of".

For example, any filtering unit illustrated in any of the figures can be limited to the components illustrated in the figures, can also have unspecified elements that do not materially affect the basic and novel characteristics or may have additional, unrecited elements.

For example, any pool cleaner illustrated in any of the figures can be limited to the components illustrated in the figures, can also have unspecified elements that do not materially affect the basic and novel characteristics or may have additional, unrecited elements.

In the claims and specification any reference to the term "consisting" should be applied mutatis mutandis to the term "comprising" and should be applied mutatis mutandis to the phrase "consisting essentially of".

In the claims and specification any reference to the phrase "consisting essentially of" should be applied mutatis mutandis to the term "comprising" and should be applied mutatis mutandis to the term "consisting".

Any reference in the specification to a method should be applied mutatis mutandis to a system capable of executing the method.

Any reference in the specification to a system should be applied mutatis mutandis to a method that may be executed by the system.

The term "substantially" or "about" can refer to an accuracy (or deviation) of any value between 1 and 20 percent.

The term "proximate" may refer to a range of distances that may span, for example, between a fraction of a millimeter and less than 5 centimeters.

Any combination of any components of any of the pool cleaners illustrated in any of the figures may be provided.

Any pool cleaner (or filtering unit) that is illustrated in a figure may include additional components, may include alternative components, may include fewer components, may be limited to the components illustrated in the figure or may be essentially limited to the components illustrated in the figure.

For example, any filtering unit that is illustrated as including a single filtering element may include two or more filtering elements.

For example, any filtering unit that is illustrated without a set of impeller blades may include a set of impeller blades.

For example, any filtering unit that is illustrated with a set of impeller blades may exclude a set of impeller blades.

For example, any filtering unit that is illustrated as including an interfacing element (of a cleaning element) that is a brush may include (in addition to the brush or instead of the brush) another interfacing element such as but not limited to a bar, a rotating rod connected to plates, and the like.

For example, any pool cleaner that includes a filtering unit that includes a set of impeller blades may include an additional impeller or may be limited only to the set of impeller blades.

For example, any filtering unit, may include a debris trap.

Figure 18:
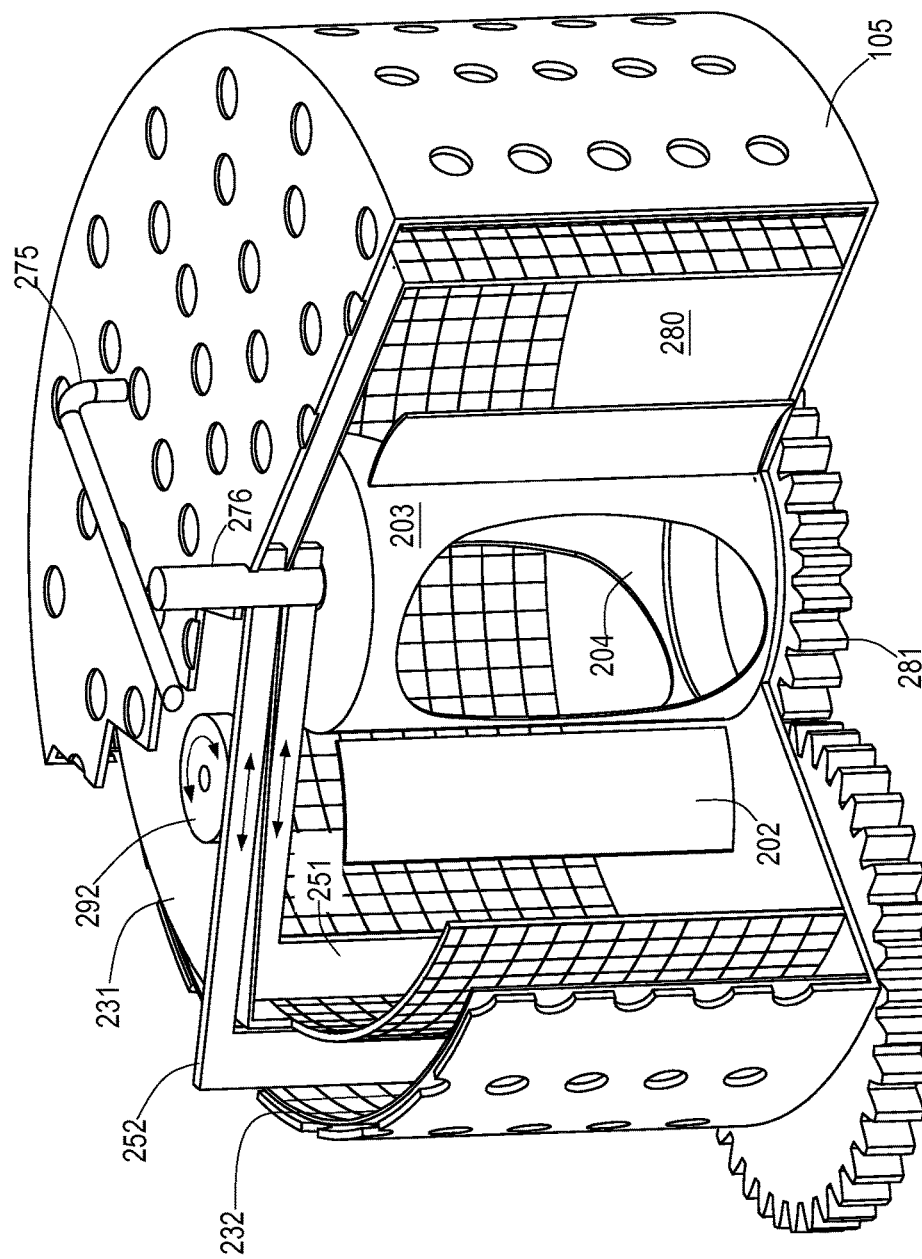
FIG. 18 illustrates a filtering unit that includes cleaning elements and a set of impeller blades according to an embodiment of the invention.
Figure 19:
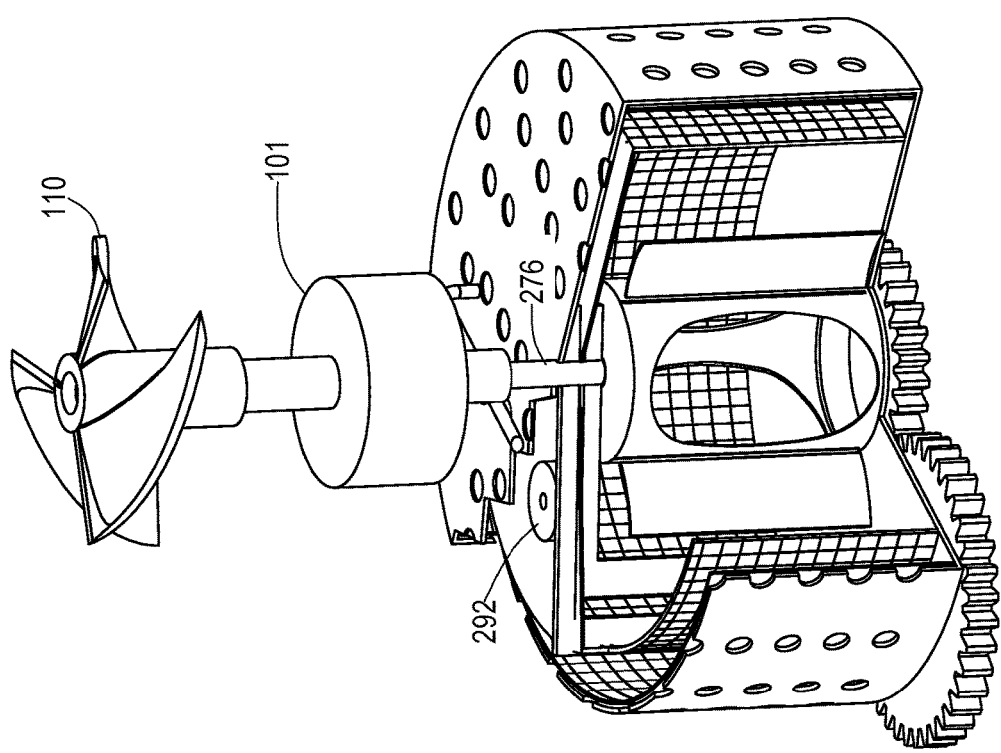
FIG. 19 illustrates a filtering unit that includes cleaning elements and a set of impeller blades according to an embodiment of the invention.

Yet for another example, every filtering unit that includes a cleaning element that has an interfacing portion (such as a brush, a rod, a scrapper, an arm) that contacts a filtering element may, as illustrated in FIGS. 18 and 19, include a movement element that is configured to automatically move the interfacing portion in relation to the cleaning element thereby changing a distance between the interfacing portion and the filtering element. Especially, the movement element 292 may be configured to move the interfacing portion between a first position in which the interfacing element interfaces with an inner section of the filtering element (and may clean the filtering element) and a second position in which the interfacing element is spaced apart from the inner section of the filtering element (and does not clean the filtering element). The movement element may be actuated by, for example, a motor and a gear that may move the arm in a radial movement, may rotate the interfacing portion, and the like. Movement element 292 may form part of, for example, motor 101 and/or rotor 102. Such a movement element may contribute to a non-continuous cleaning operation.

In FIG. 19 for example, cleaning elements 251 and/or 252 may each move separately or in tandem in a clockwise (CW) motion or in either an alternating anti-clockwise motion (CCW). Such a CW or CCW motion may revolve around the entire circumference of the filtering element or just a part thereof. It may intermittently revolve and clean only a smaller section of the said filtering element circumference, then stop, reverse direction and backtrack whereby the cleaning element alternately move back and forth each cleaning sections of the filter element(s).

According to various embodiments of the invention the above drawbacks are remedied by at least one of the following:

a. creating an internal positive pressure;

b. eliminating a potentially sharp and harmful blade or blades;

c. lowering the center of gravity of the impeller and thereby creating a lower momentum of force against wall disengagements; and d. positioning the impeller blades at the more advantageous position as close as possible to the point of water entry into the hydraulic path inside the hollow body without the risk of blade breakage or blade denting; a more effective and efficient water outlet mechanism.

e. Saving on costs by employing filtering unit integrated impeller blades that may rotate at substantially lower rpm thereby reducing wear and tear as opposed to pumping mechanisms employing high rpm pumps.

According to a first embodiment of the invention the impeller blades and the filtering unit mechanism are combined into one single revolving unit that is positioned at the inlet or point of water entry into the hollow body hydraulic system path.

FIGS. 1-6 are cross sectional views of pool cleaners 10 according to embodiments of the invention.

Some of these figures illustrate a pool cleaner that includes a filtering unit. It is noted that the figures may be out of scale (or in scale). For example—an actual size of the filtering unit in various figures may be bigger or smaller than what is shown in various figures.

In FIGS. 1-6 a single drive motor system with a transmission mechanism (such as gears) is configured to rotate both the filter unit and the driving wheels of the cleaner can also be seen. One or more additional motors may be used. For example—one or more motors may be included in a rotating mechanism for rotating the filtering unit or the spinning around its own axis of a cleaning element while one or more motors may belong to a driving mechanism for moving the pool cleaner.

FIG. 1 illustrates a pool cleaner 10 having a housing 70. The filtering unit 20 is positioned above an inlet 11 located at the bottom of housing 70.

The filtering unit 20 has a gear 21 (filtering unit gear) that meshes with a first gear 41 that is rotated by motor 30. The first gear 41 also meshes with a second gear 42 of a portion 50 of transmission system 40 that converts the rotation of the motor to a rotation of an element (such as axis 52) of a pool cleaner drive system that moves the pool cleaner.

It is noted that any transmission system may be used for converting the rotation of motor 30 to a rotation of the filtering unit 20 and/or rotation of an element of the drive system (such as a rotation of a wheel, a set of wheels or a brushwheel 60).

Gear 21 is located at the lower part of the filtering unit and in proximity (for example 0.1-50 millimeters) to the bottom of the housing. Gear 21 can be positioned at other locations. Interfacing elements 22 (such as rotating cylinders) assist in maintaining the filtering unit at the same position despite the rotation of the filtering unit. The interfacing elements may be connected to the housing or to any other elements of the pool cleaner.

Motor 30 and transmission system 40 are near the bottom of the housing.

The transmission system 40 and/or motor 30 may be encapsulated within a water sealed box that may also comprise an electronic computerized control unit (not shown).

Figure 2A:
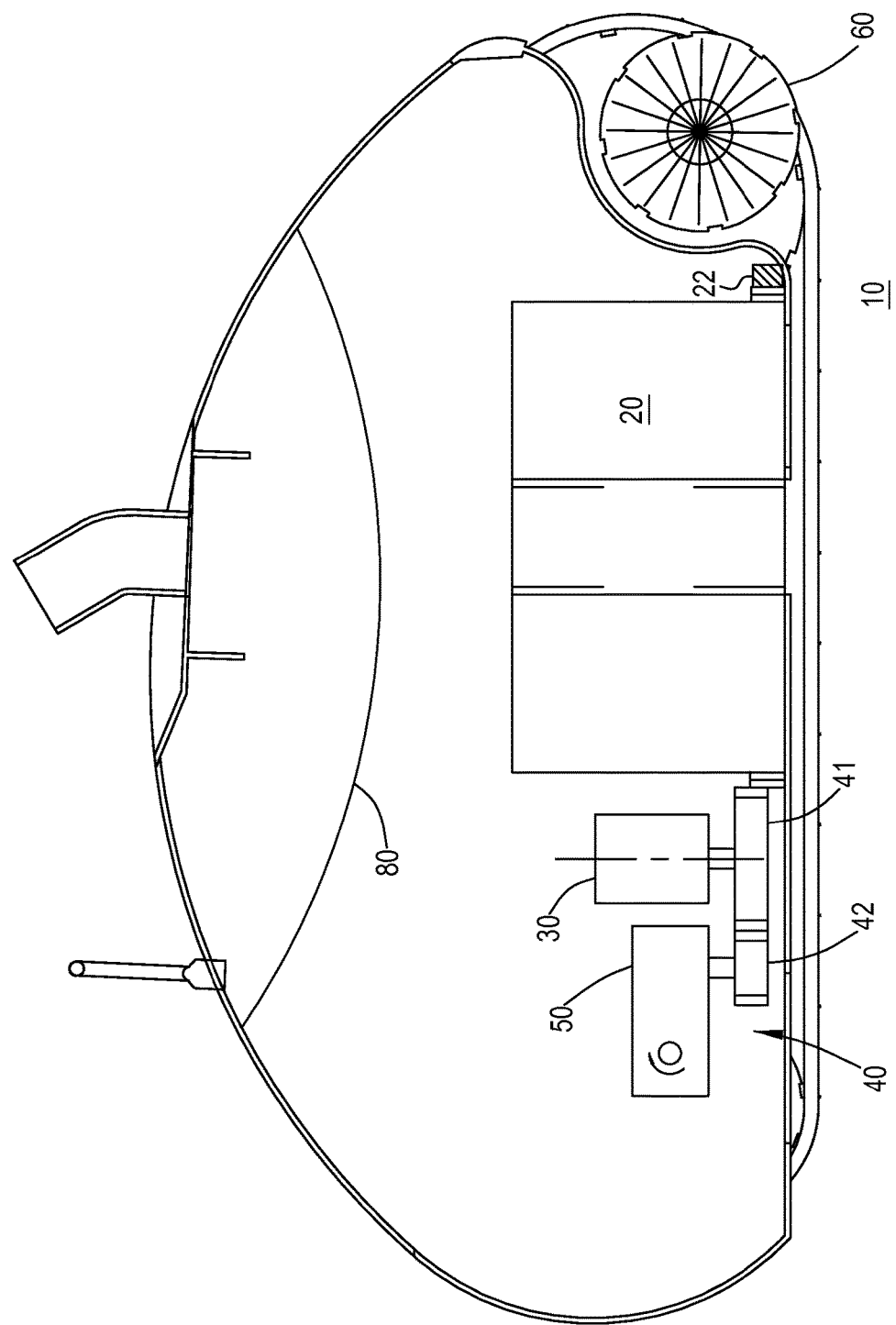
FIG. 2A is a cross sectional view of a pool cleaner according to an embodiment of the invention.

FIG. 2A illustrates a pool cleaner 10 in which the interfacing elements 22 are not positioned directly above gear 21 but are positioned such as to mesh with gear 21 without preventing the filtering unit 20 from being extracted from the upper portion of the housing—after removing or moving an upper removable lid 80 that can be removed or moved for extracting the filtering unit 20

FIG. 2B illustrates a pool cleaner 10 with the upper removable lid 80 that in an open position for extracting the filtering unit 20 from the upper portion of the housing.

Figure 3:
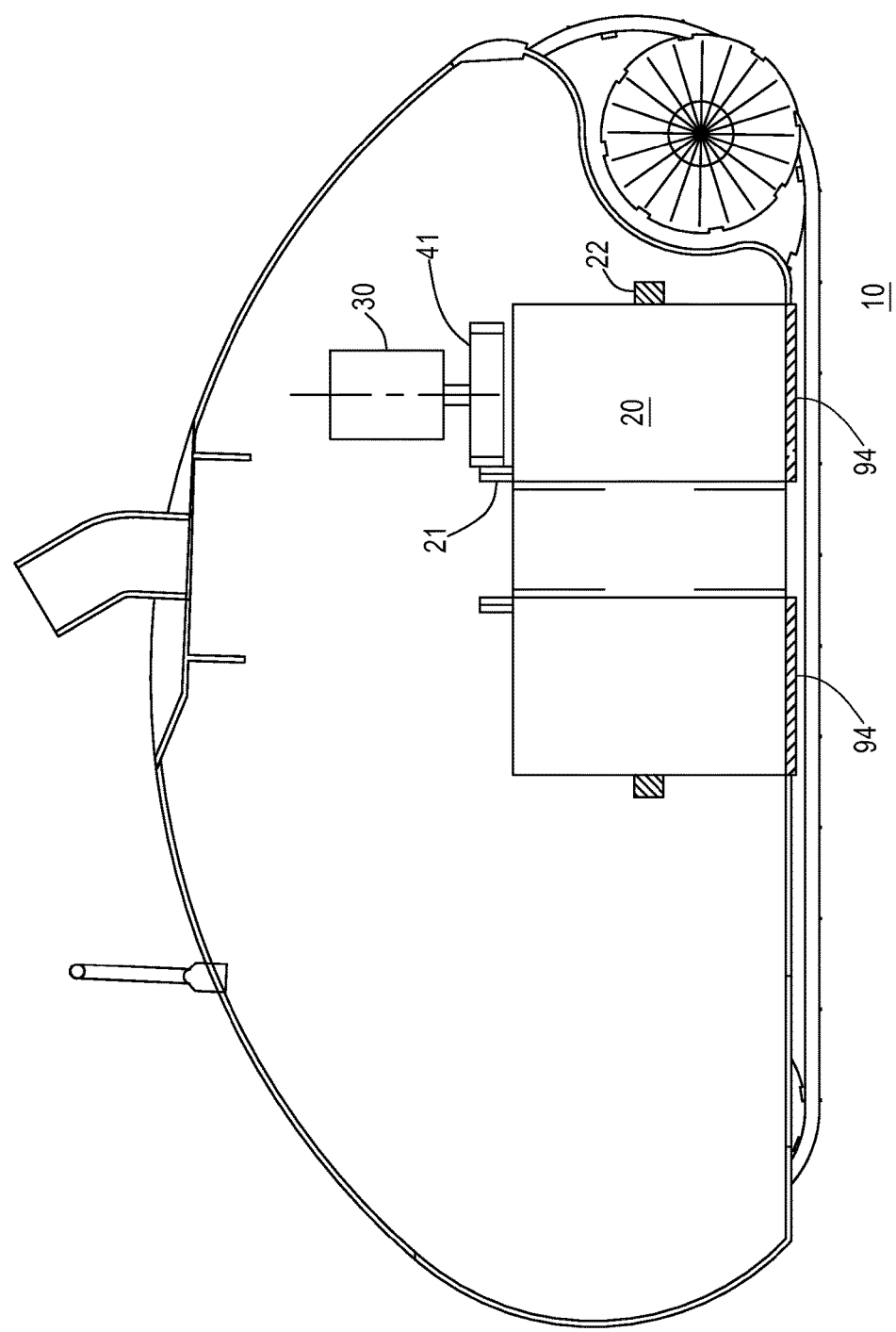
FIG. 3 is a cross sectional view of a pool cleaner according to an embodiment of the invention.

FIG. 3 illustrates a pool cleaner 10 in which the motor 30 is positioned above the filtering unit 20 and the first gear 41 meshes with gear 21 that is located at the top of the filtering unit 20. Rotating mechanism 40 and the hydraulic system space, between 11 and 14 in FIGS. 6 and 17, may share one or more motors. FIG. 3 illustrates a bottom 94 of the filtering unit. The bottom as well as the entire filtering unit 20 with or without filter enclosure 105 may be extracted from the pool cleaner.

FIG. 3 depicts an embodiment in which the filtering unit may be extracted from the bottom portion of the housing whereby the bottom of the filtering unit is snugly and sealingly positioned within the hollow bottom aperture and flush in relation to the bottom of the housing 70 that comprises a filter enclosure locking and securing latch (not shown)

In any of FIGS. 1-6, 8, 9, 10, 11, 12, 13, 15 and 17 the filtering unit may include internal Impeller blades and multi layered filter screens such as illustrated in PCT Patent Application No. PCT/IL2013/051055 titled AUTONOMOUS POOL CLEANER and which is herein incorporated in its entirety.

The filtering unit may be extracted from the bottom of the pool cleaner—as illustrated in PCT Patent Application No. PCT/IL2013/051055 titled AUTONOMOUS POOL CLEANER and which is herein incorporated in its entirety.

The filtering unit may be rotated by means of a separate motor positioned above (depicted here is a gear motor). The pool cleaner provides an extended use of a pool-cleaning filter by maintaining a viable and potent internal pressure.

Another major problem for reduced internal pressure is the frequent clogging of a filtering element of the pool cleaner. This has specific bearing on the proposed additional solution of an internal self-cleaning mechanism that is described below.

In general, such filtering assembly systems replace the more common Pump or impeller motor mounted blade impellers. The present internal blades may be rigid and come in direct contact with incoming debris and water. The filtering unit comprises of said internal blades and it is in contact at its center with a spindle or a shaft of a drive/pump motor. The said drive/pump motor may be combined into a single motor that may also include a transmission system and an electronic control system with linkage to sensors or actuators. Alternatively, the common, costlier configuration of at least two dedicated motors: drive and/or pump motors may still be used without losing the main advantages of the present invention.

The external periphery of the filtering unit can be made of one or more filtering elements or a filter enclosure. Each filtering element may be a mesh net or a series of such nets that partially surround each other and may, for example, be positioned one after the other in the hydraulic path in a series that filters large debris and thereafter, smaller size debris and a final net with small pores to filter fine dust.

The filtering elements may be serviceable (cleaning/washing) or replaceable or disposable. The nets may be constructed of metal or plastic, paper, carbon based fibers or a combination of these. The nets may be made of woven fiber mesh, non-woven mesh, polymer, textile, paper, carbon based fibers, or combinations thereof. Filtering elements can have different configurations—for example coarser filtering elements at the beginning of a swimming season and finer filtering elements as the swimming season progresses.

The filtering unit may have different filtering elements (such as different segments) that differ from each other—for example by the size of their pores—the first coarse section with large pores is used to filter larger debris for the beginning of the season, and the rest, finer section, to filter cleaner pool water and surfaces.

The cleaning element may prove most beneficial for a filtering element that may specifically comprise carbon nano-tube yarns and a warp and weft configuration generally employing nano-technology that may solve the negative problem of the ratio between actual yards strand thickness and the pore sizes that form a filter textile architecture. Amongst other possible developers, filters developed by, for example, Argonide Corporation USA, are a new type of water filter media combining the proven benefits of standard filters with nano-technology to create a unique filter possessing removal capabilities well beyond the scope of conventional filtration technologies. Besides reduced pore sizes, utilizing additional principles such as for example, electro-adhesion, it becomes possible to remove a wide range of water borne contaminants including bacteria, cysts, viruses and colloidal particles; It may utilize 2 to 3 micron nominal pore size to trap particles between 0.5 and 2 microns and combine this with the electro-adhesion to trap fine and ultra-fine particles down to a 0.02 microns. This combination of physical filtration and/or electro-adhesion results in a filter with higher removal and filtration capacities. Such minute size pores that may be used in pool cleaners and/or swimming pools may benefit by the accommodation of a filtering element or media self-cleaning mechanism that forms part of the present invention.

The revolving filtering unit centrifugally pushes the incoming water, debris and dirt onto the periphery of the filtering mechanism thereby leaving an empty unused space at the center of the filtering unit that causes the drawing of the water from the water inlet. The filtered water traverses the filtering media, nets or mesh en route to the evacuation point at the pool cleaner outlet, for example, in the upper section of the housing 70. At the inlet, there is positioned a one-way non return valve mechanism that prevents water from returning to the pool water. The valve opens by the suction power that is created by the suction force.

The inlet may also contain chopping elements that will reduce large leaves or other debris to "digestible" sizes (not shown).

In contrast with pressure side automatic pool cleaners (APC) that are well known in the art and focusing here only on the specific context of electrical APC, the above described configuration and hydraulic system create—as a main object of this invention—a high positive internal pressure inside of the hollow body and not a low negative internal vacuum based pressure. The drawbacks of a low negative internal vacuum system are described above. Due to the proximity of the pump and Impeller integrated arrangement to the water inlet (usually at the bottom of the hollow body), the incoming water is pushed and pressed inside the hollow body of the pool cleaner. By comparison, when an impeller is placed closer to the water outlet (usually at the top of the hollow body) the drawn-in water is pulled inside and due to the subsequent internal vacuum created, the drawing of water is occurring not just from the inlet but also from any other opening in the hollow body, thus causing a loss of suction power and ingression of dirt and debris. The present invention ensures that the water drawn-in from the bottom inlet and pushed out through the filter(s) onto the outlet does so without losing any suction power. The pool cleaner will adhere to the pool surface by both the sheer suction pressure that is created at the inlet point and with the downward pressure created by the evacuating water at the outlet.

An electronic digital communication from the control box is enabled by means of an electrical cord to the Power Supply outside the pool. Another embodiment calls for a battery operated pool cleaner that may provide the electrical energy and also communicate with the end user by means of a floating buoy connected to the control box by means of a dedicated cable that may emit radio messages to the said power supply receptors.

In any embodiment, the emitting—directly or indirectly via power supply—can be communicated to the Smartphone of the end user.

Another embodiment of a battery or cordless operated type pool cleaner may identify and navigate to an underwater docking station (wet station) on which it may be able to electronically control the automatic replacement of the said filtering unit while conductively charging its batteries underwater.

In other embodiments, the pool cleaner may climb or be automatically lifted or hoisted out of the pool water in order to identify and navigate to an external (dry land) docking station on which it will perform a filtering replacement procedure while charging its batteries.

In both above embodiments (motors located at the bottom of the hollow body or in the upper section or two motors split apart) the entire filtering unit is removable for servicing and may be removed from the bottom or from the top section of the housing. The top section may be secured by a lid. The lid may be a removable lid, may be detacheably coupled to other parts of the housing, may rotate about an axis to expose the interior of the pool cleaner, and the like. A bottom filter removal version may be manually secured by a latch (not shown).

FIGS. 2A-2B illustrates a lid 80 of the housing 70 that may be positioned in a first position in which lid 80 and other parts of the housing form a substantially closed housing and may be positioned (for example by rotation about an axis) at a second position in which the interior of the housing is exposed and the filtering unit 20 may be extracted through an opening defined by the lid.

By pressing onto the bottom filter base plate (not shown) that will release the filtering mechanism from the axis/spindle/perforated cylinder (denoted 93 in FIGS. 2B and 14, 160 in FIG. 16 or 203 in FIG. 18) that may be held in place using a spring loaded clip mechanism. The reverse is performed by pressing the filtering unit back and clicking it back into place. Such a releasing and mounting mechanism may also be used for a top loading configuration but a removable lid (hinged or not hinged) may comprise indentations or ribs that may hold and lock the filtering unit in place.

The spindle may be connected to a drive motor by means of a gear or it may be connected directly as an extension of the drive motor spindle. The said drive motor may be the traditional low RPM drive motor (for example, 50-52 RPM) or the fast revolving pump motor mentioned above in conjunction of gears.

The removal and reinsertion of the filtering unit may also be actuated automatically by means of a releasing actuator that disengages the filtering unit from the main spindle and lets it slide downward to be grabbed by a manipulator that—after filter removal—will reinsert a new filtering unit and click it into place.

The filtering unit operation and automatic evacuation or reinsertion and the motor or motors—are governed by means of an electrical control unit that is placed in a watertight compartment. This control unit oversees the motors scanning and operating program that is stored in the memory chip. It also controls the sensors that are placed inside the cleaner to identify and advise the user that the filtering unit needs manual or automatic servicing or send the user any data or information relating to the pool cleaner performance or swimming pool conditions.

The Self Cleaning Filter Embodiment

As stated above, there may be provided filtering units with at least one or sets of self-cleaning—revolving or static brush (or brushes) or one or more scraper mechanisms—that continually or intermittently brush the net surfaces in order to expose new tracts of the filtering net by the brushing effect and water turbulence near the surface of the filter net or filter nets. FIGS. 8-16 illustrates cleaning elements of various types (inverted L shaped arm 90 of FIG. 8, rotating rod connected to plates (such as alternating plates) to form cleaner 100 of FIGS. 9 and 10, vertical brushes 131 and 143 of FIGS. 11 and 13), double arm 92 of FIG. 15, blades 150 of FIG. 14, curved brush 142, a cleaning element core such as inner cylinder 160 that is connected to brushing elements 161 and has holes 162) that are used to interface with inner portions of a filter and clean it. These cleaning elements may be rotated or moved by an on-axis movement element (engine 101, turbine or impeller 110) that has a rotation axis that is located at the center of the filter (see FIGS. 10, 12, 13, 15 and 16) or moved by off-axis movement element (rotor 102 of FIGS. 9 and 11). The cleaning element may rotate about the axis of the movement element (FIG. 16), by located off-axis of the axis—but connected by an arm (141 of FIGS. 12 and 13) or to a gear (gears 282 and 281 of FIG. 19), may be connected to the rotating element via the center of the filter (FIGS. 8, 12-15) or via gap between the filter and the filter cover (gap 104 of FIG. 9, see also FIGS. 10 and 11).

Figure 8:
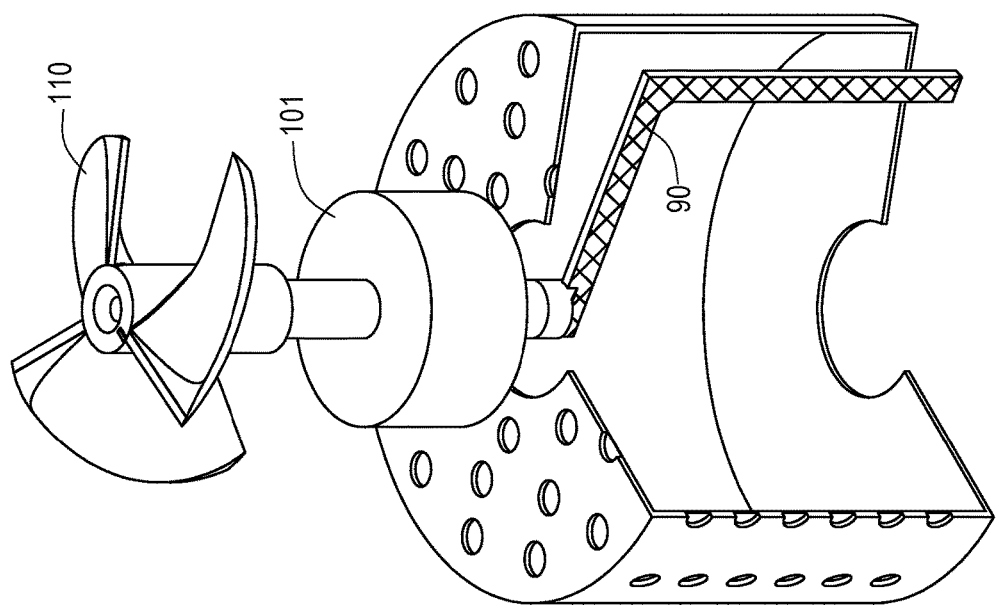
FIG. 8 illustrates a filtering unit that includes a cleaning element, a movement element and an impeller according to an embodiment of the invention.
Figure 11:
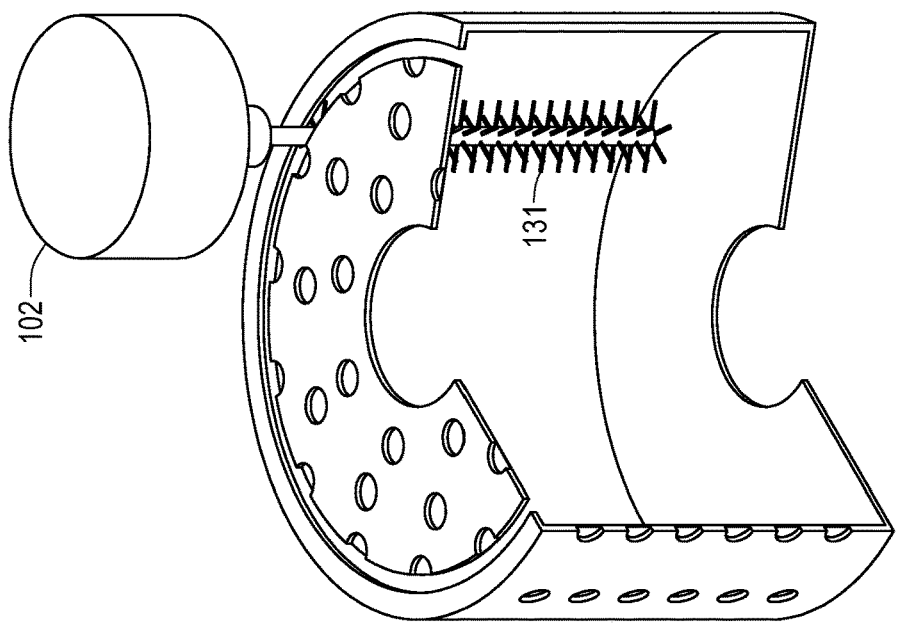
FIG. 11 illustrates a filtering unit that includes a cleaning element, and a movement element according to an embodiment of the invention.

FIG. 8 illustrates an embodiment whereby a movement element and an external impeller location employing a static non-rotating filtering element; whereby a cleaning element may continuously or intermittently rotate along the filtering unit internal perimeter that is controlled from a control box (not shown) included with engine 101; and whereby the filter enclosure or the filtering elements (not shown) may be extracted for servicing from a bottom opening of the housing.

Figure 9:
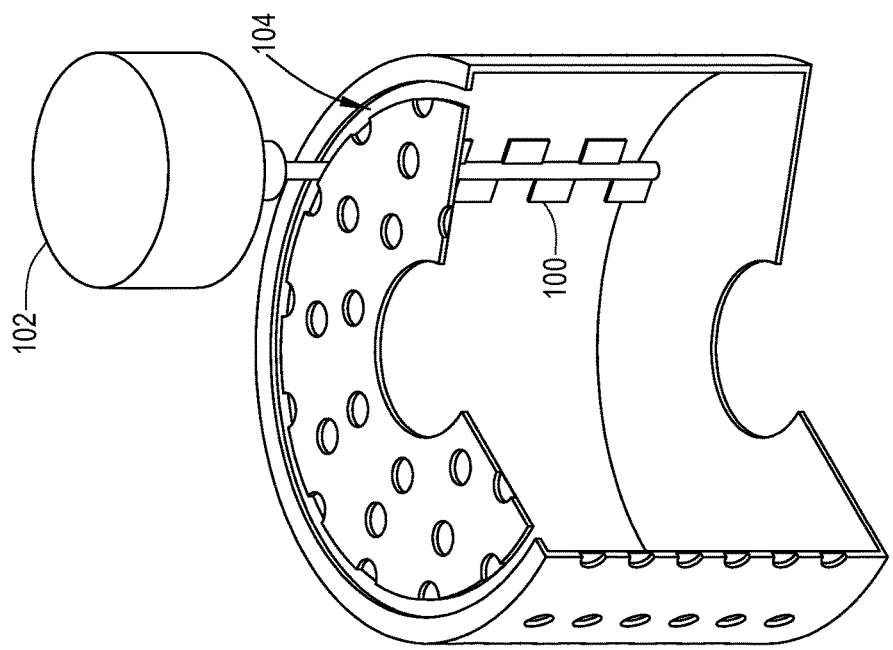
FIG. 9 illustrates a filtering unit that includes a cleaning element and a movement element according to an embodiment of the invention.
Figure 10:
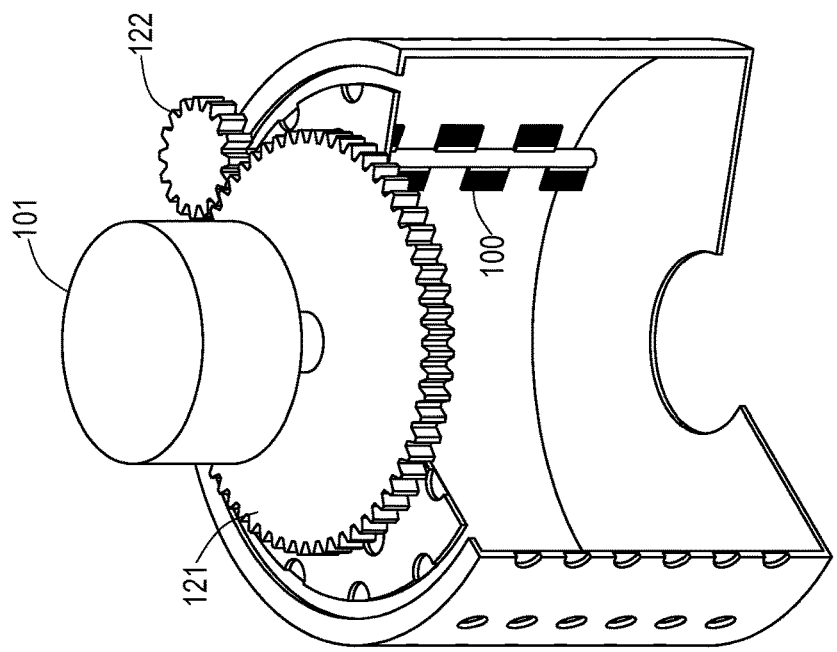
FIG. 10 illustrates a filtering unit that includes a cleaning element, and a movement element according to an embodiment of the invention.
Figure 13:
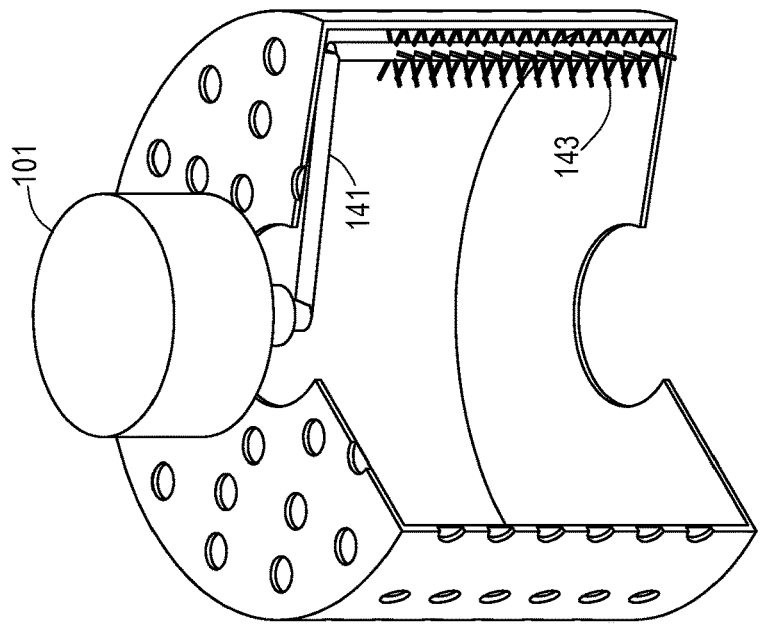
FIG. 13 illustrates a filtering unit that includes a cleaning element, and a movement element according to an embodiment of the invention.
Figure 12:
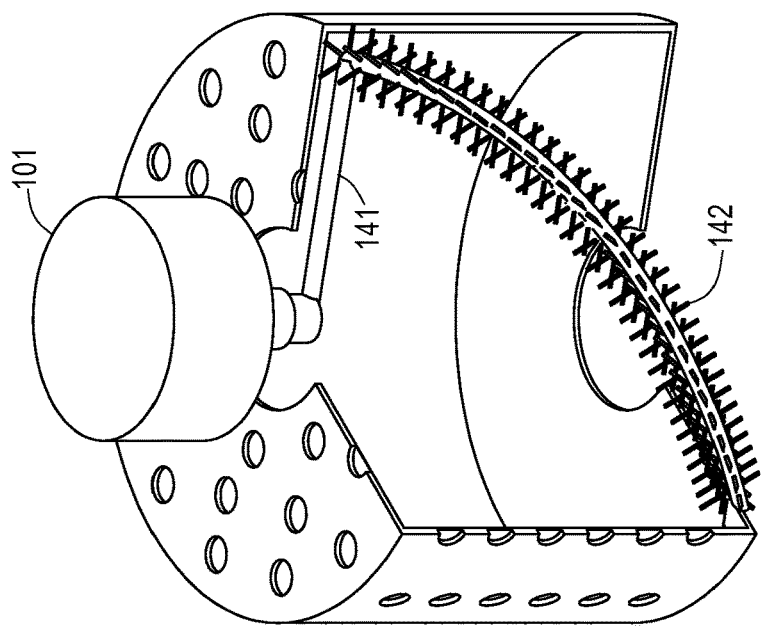
FIG. 12 illustrates a filtering unit that includes a cleaning element, and a movement element according to an embodiment of the invention.
Figure 15:
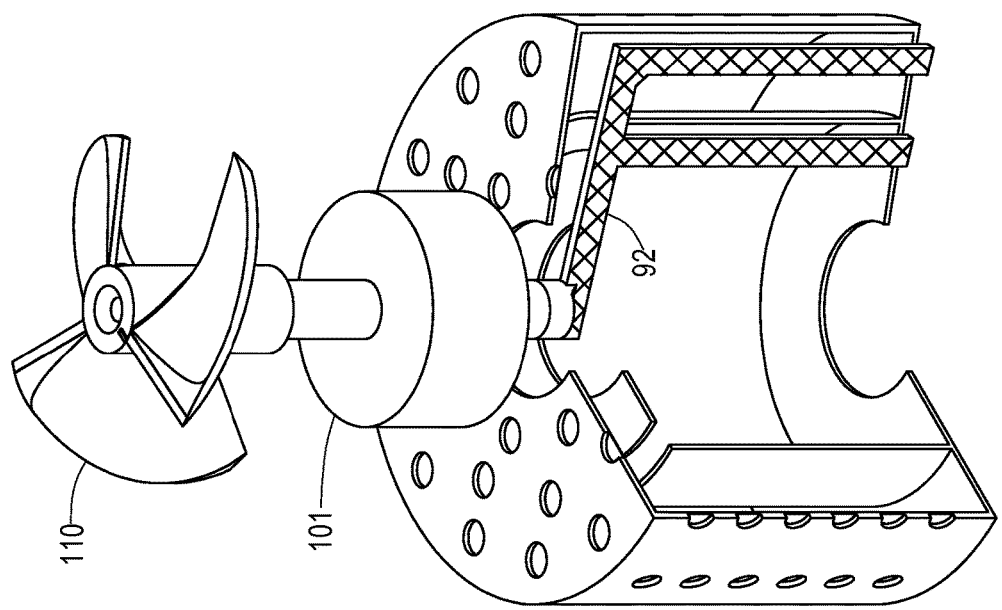
FIG. 15 illustrates a filtering unit that includes a cleaning element, an impeller and a movement element according to an embodiment of the invention.
Figure 14:
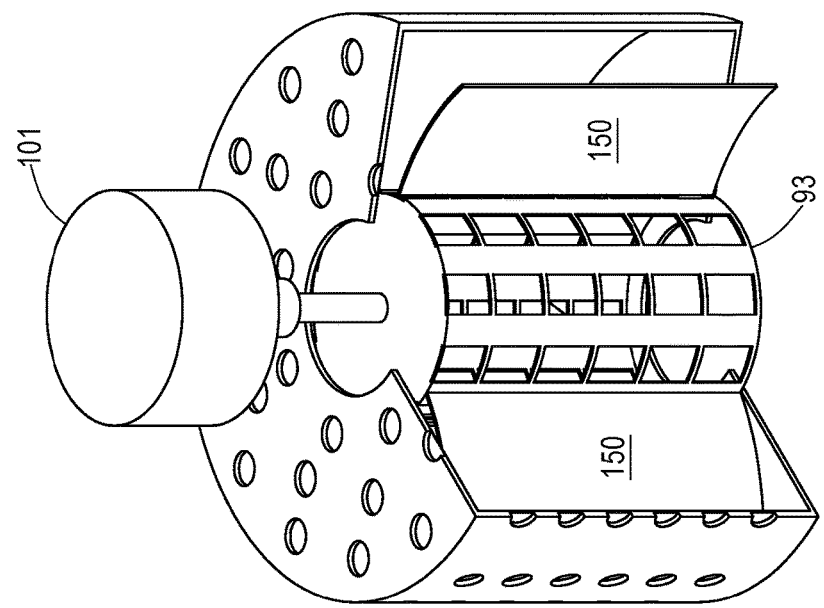
FIG. 14 illustrates a filtering unit that includes a cleaning element and a set of impeller blades, and a movement element according to an embodiment of the invention.

FIG. 9 illustrates a dedicated movement element that may spin a cleaning element around its own axis that may be employed in conjunction of a rotating or a static non-rotating filtering unit according to an embodiment of the invention;

FIG. 10 illustrates a movement element employing a gear transmission to rotate the filtering unit that may also spin a cleaning element around its own axis that may be employed in conjunction of a rotating filtering unit that may contain impeller blades 150 (not shown) according to an embodiment of the invention;

FIG. 14 illustrates a filtering unit that includes a set of internal impeller blades without use of any cleaning element(s); and a movement element to rotate the filtering unit according to an embodiment of the invention; and whereby the filtering unit or enclosure may be extracted for service from a bottom opening of the housing.

A Pool Cleaner that specifically comprises a static or rotating filtering unit or an enclosure (cartridge, screen(s)) with an integral, cleaning rotating or static blade or brush or scraper to wipe the filter screen simultaneously whilst the pool cleaner is busy with its automatic pool movement/ scanning cycle and performing floor or wall cleaning tasks. The brushing or scraping activity provides clean filter mesh areas and increased usage of a given filter volume. Wiper blades or filter system are rotatably driven so as to have an edge of the wiper blade rotatably moving on the screen for moving dirt, debris solids or cake collected on the screen(s).

Cleaning elements such as wiper or brushing blades may be attached or form part of a device such as an arm or a cylindrical structure that is static in relation to the pool cleaner body and the wiping is performed on the revolving or rotating filter surface. On the other hand, the said cleaning element may be connected to a motor shaft (geared drive motor) that will rotate around the inside and cover the internal walls of the filter screen. In addition, the device may be connected to another gear arrangement that will rotatably revolve the cleaning element around itself while covering the internal walls of the filter screen.

a. The cleaning element may be of various types and shapes:

b. It may consist of a straight arm comprising various type brushes and scrappers with bristles or hairs or without. The cleaning element may be of an inverted L-shape when a said drive motor is positioned above or below along a central imaginary longitudinal axis of the filter mechanism thereby bringing the brushes nearer to the screen surfaces.

c. The cleaning element may have a step or a cam type shape with extension arms comprising pivoting brushes and/or scrapers assembled in various mixes of configurations so that when the entire cleaning element pivots it brushes against the screen surface and interacts with it by intermittently introducing different sections of the rotating arm (it may intermittently also employ different types of brush tips or bristles or wipers) and thereby adding swirl effects into the water nearby the filter screen surface.

d. The cleaning element may comprise of a device that has a revolving or non-revolving spiral shape (straight line, inverted L-shape, diagonally positioned across the filter. The cleaning element may comprise of a cylindrical structure (a hollow structure that can be removably fitted onto the spindle (denotes 93 in FIGS. 2B and 14, 160 in FIG. 16 or 203 in FIG. 18) within the filter screen structure so that the cleaning element comprises any of the brush/scrapers, with bristles or without attached onto the external periphery of the cylindrical structure. Such as a perpendicular spiral shaped hollow brush device that rotates inside a static filter structure.

Figure 16:
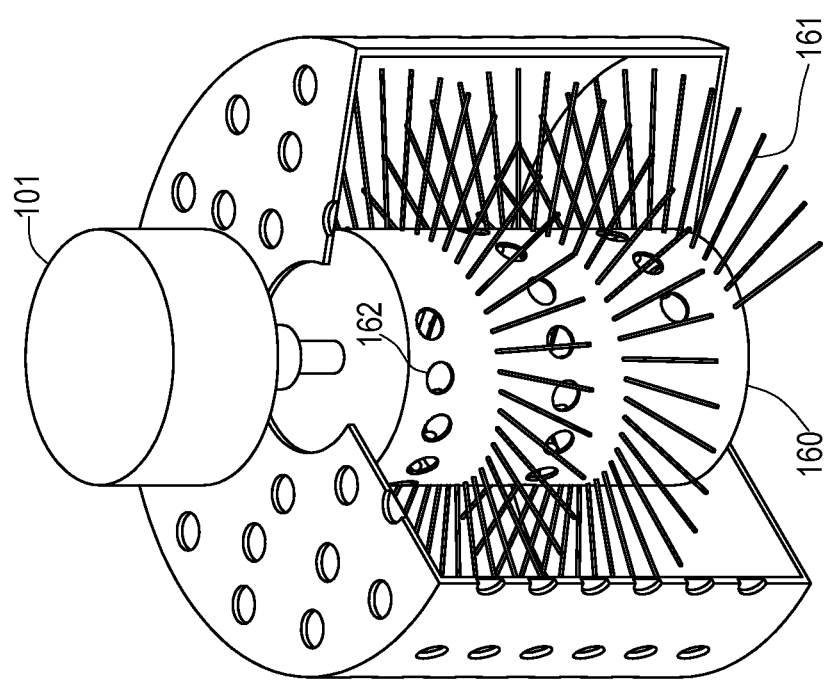
FIG. 16 illustrates a filtering unit that includes a cleaning element, and a movement element according to an embodiment of the invention.

The internal core or perforated cylinder denoted 93 in FIG. 2B and in FIG. 14, 160 in FIG. 16 or 203 in FIG. 18 may, in addition or alternatively, comprise of impeller blades that are located inside the internal core (not shown) in order to provide water suction force.

FIGS. 4-5 and 7-15 illustrate self-cleaning filter embodiments. It will be noted that all filter embodiments may be revolving or of the commonly used static type.

Figure 4:
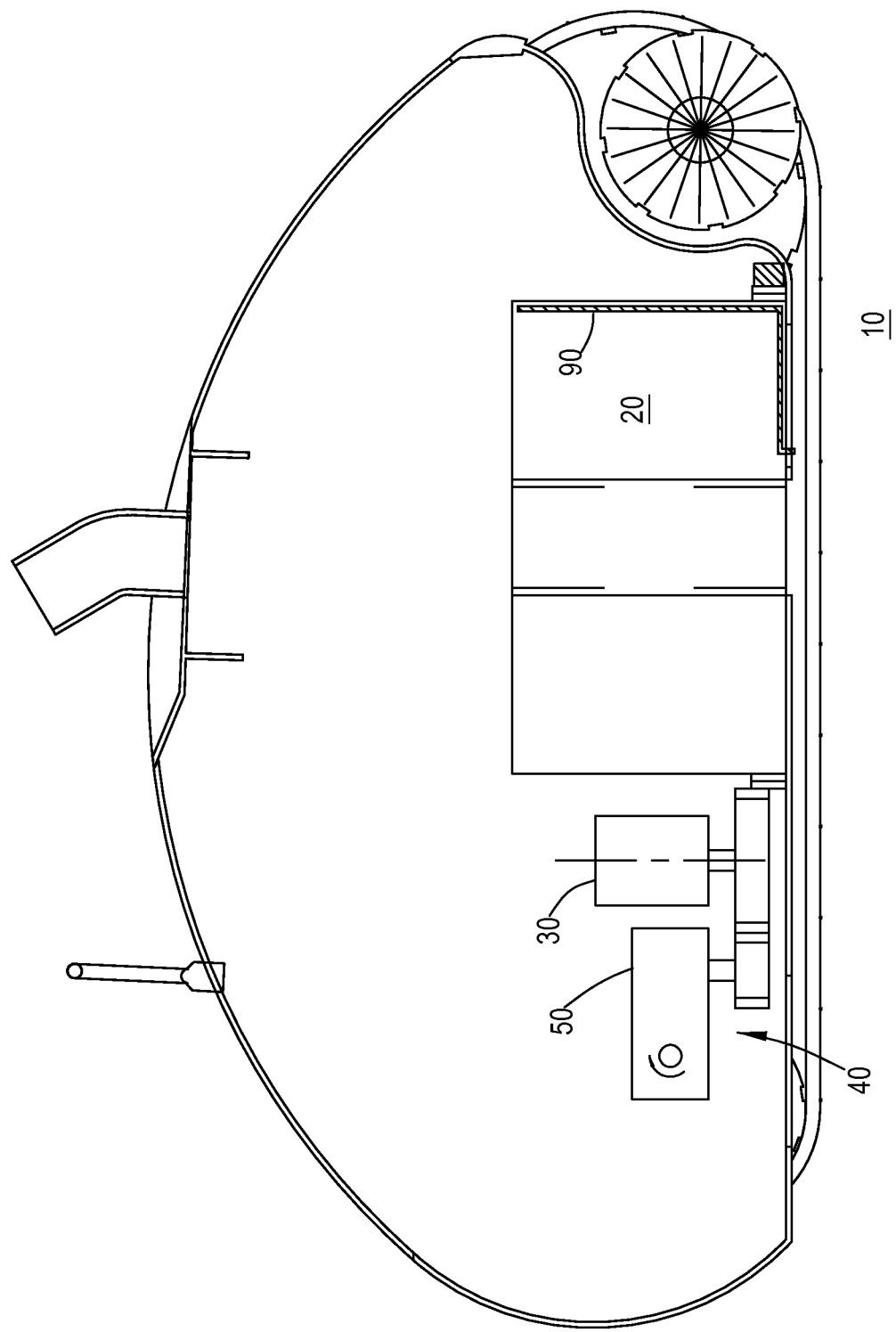
FIG. 4 is a cross sectional view of a pool cleaner according to an embodiment of the invention.
Figure 5:
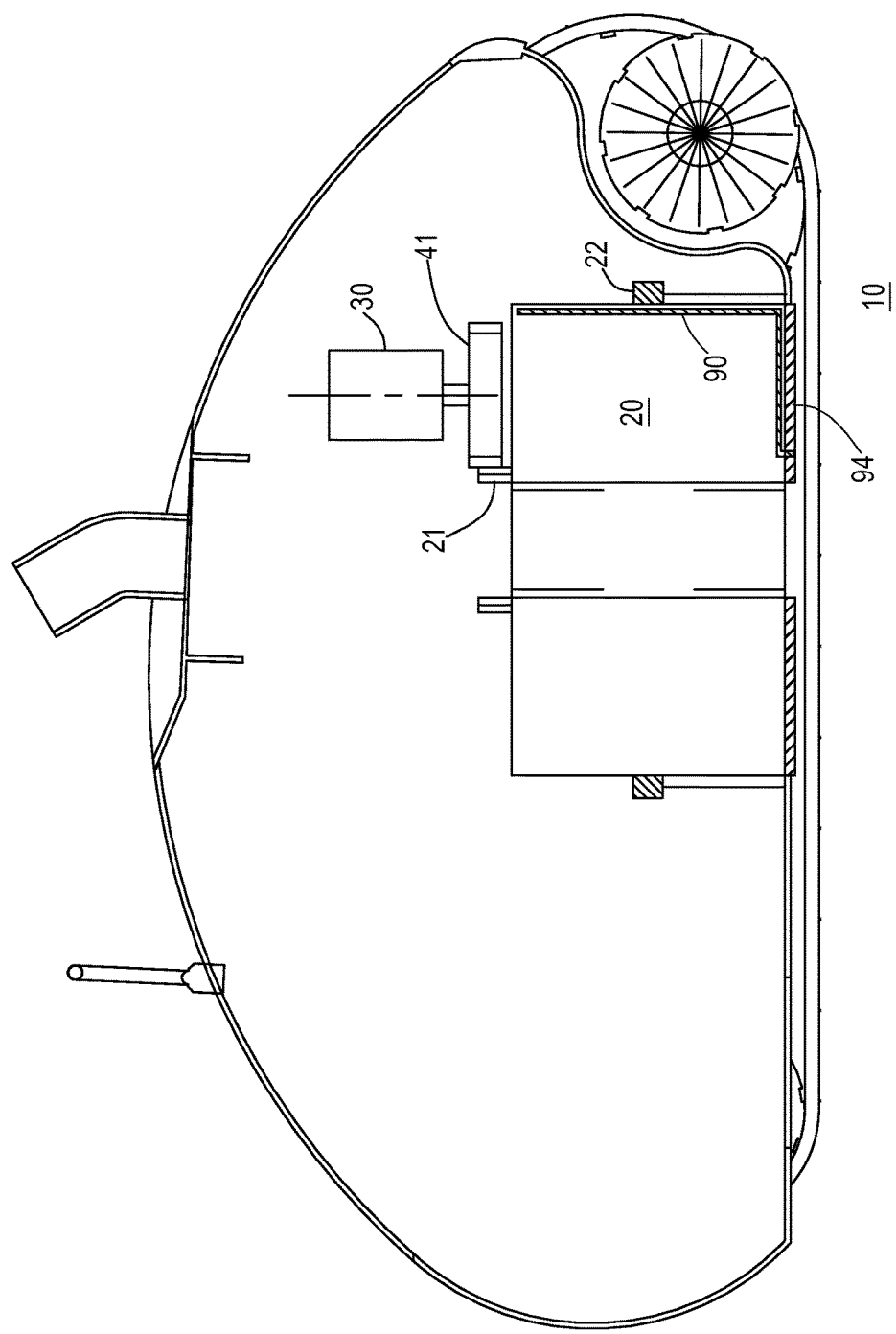
FIG. 5 is a cross sectional view of a pool cleaner according to an embodiment of the invention.
Figure 6:
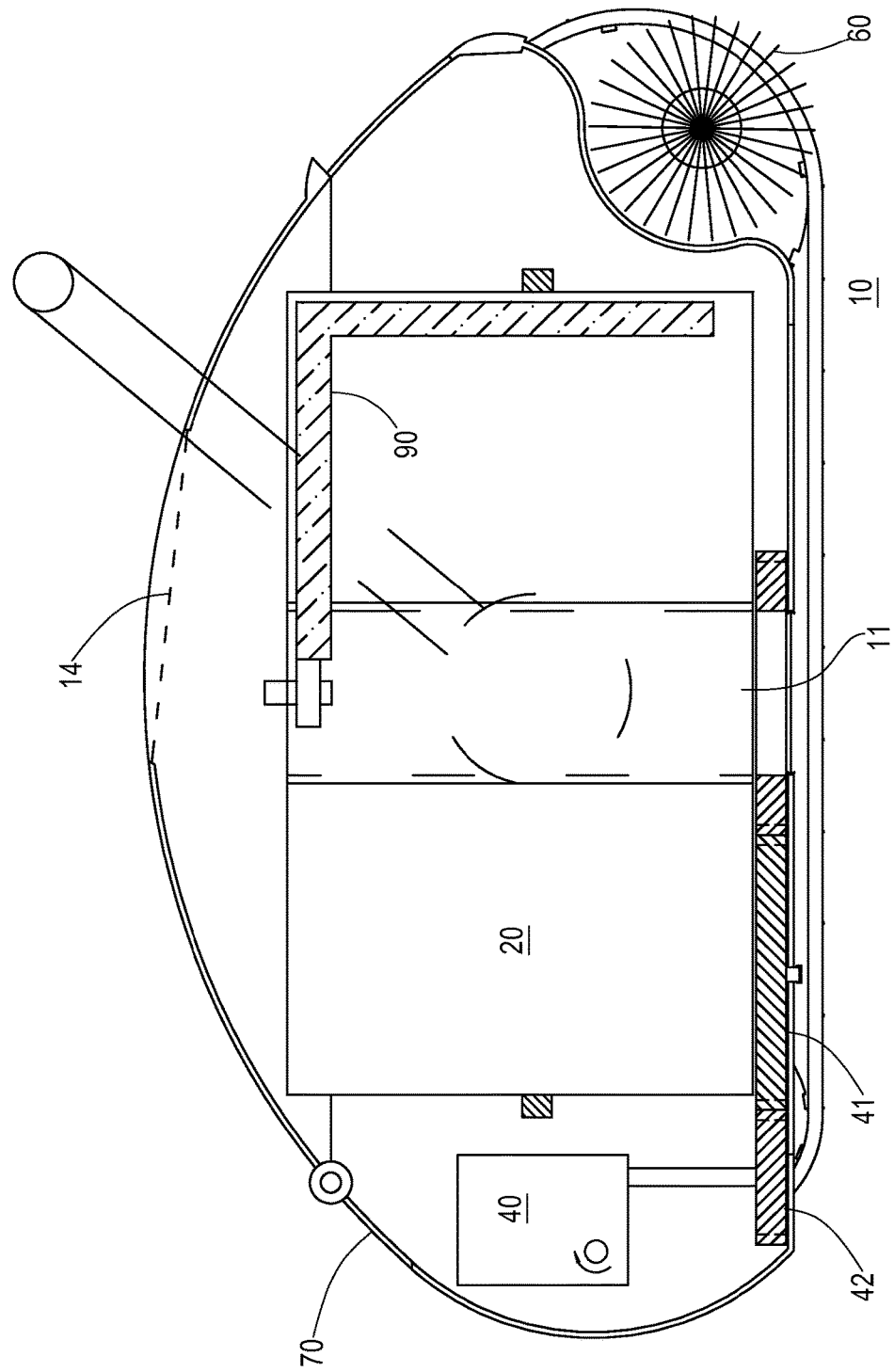
FIG. 6 is a cross sectional view of a pool cleaner according to an embodiment of the invention.

FIG. 4-5 illustrates an arm 90 that is fixed to the bottom of the housing and interfaces with the inner surface of the filtering unit 20 whereas the arm 90 is fixed regardless a rotation of the filtering unit 20.

FIG. 16 illustrates an internal filter cleaner that has a cleaning element core such as porous cylinder 160 that is connected to interfacing elements such as helical or spherical brush 161 with spaced apart bristles that extends from the porous cylinder 160. The porous cylinder includes multiple apertures 162. The cleaning element core may be located at the center (or about the center) of the cleaning element and may be shaped as a porous cylinder or may have any other shape. The porous cylinder is rotated by a rotating mechanism that includes engine 101 and an axle. The internal filter cleaner helical brush has the helix edges continually contact the filter walls thereby creating both a brushing and a water turbulence effect which clears the pores of the filter. Thereby improving even further the performance of the self-cleaning function. The usage of such pore structure configuration as in 162 may be most suitable for example, in indoor swimming pools that do not accumulate large debris such as leaves or twigs but do need to remove accumulated calc off the filter surface.

In FIG. 7 the spaced apart bristles are replaced by a continuous helix 108 that interfaces with an internal section of filtering element 106. The continuous spiral 108 extends from porous cylinder 107 that includes multiple apertures 109. Helix 108 may include spaced apart segments. Here too, such pore structure configuration as in 109 may be most suitable in indoor swimming pools without large debris but with a need to scrape off accumulated fine particles off the filter surface(s). Engine 101 may include an external impeller (not shown). Filtering element 106 extraction for servicing and reloading may be performed from the bottom opening of the housing 70.

Figure 17:
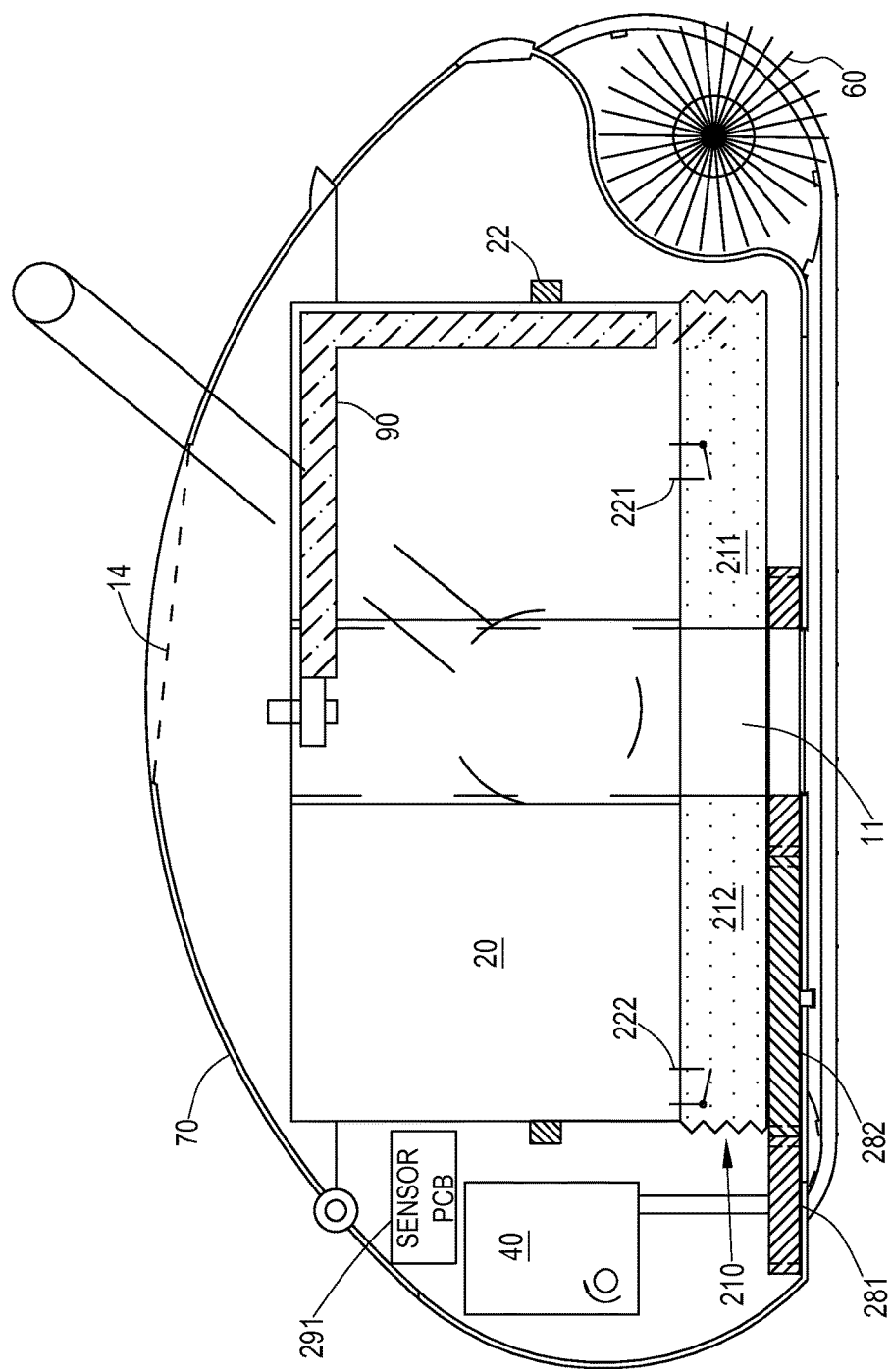
FIG. 17 is a cross sectional view of a pool cleaner according to an embodiment of the invention.

FIG. 17 illustrates pool cleaner 10 according to an embodiment of the invention.

Pool cleaner 10 includes a drive mechanism (including motor 30, mesh 42 and transmission mechanism element 50 and a PCB/sensor control device 291) for moving the pool cleaner, a housing 70 that has a first fluid opening 11 and a second fluid opening 14; a filtering unit 20 (illustrated as including cleaning element 90 and filter enclosure 105, a filtering element) and debris trap 210.

Debris trap 210 and filtering unit 20 are fluidly coupled to each other by a uni-directional flow element such as uni-directional valves 221 and 222 that facilitate a flow of debris from the filtering unit 20 to the debris trap 210 and prevents a flow of debris from the debris trap 210 to the filtering element 20.

In FIG. 17 uni-directional valve 222 is coupled to a left part 212 of debris trap 210 and uni-directional valve 221 is coupled to a right part 211 of debris trap 210.

The uni-directional valves may be located closer to the sidewalls of the filtering unit—as the debris (due to the rotation of the filtering unit) may propagate towards the sidewalls of the filtering unit.

The debris trap 210, seen in FIG. 17 substantially at its optimal radius, may rotate with the filtering unit or enclosure (by mechanical coupling with the filtering unit), may rotate independently (by a mechanical coupling with motor 30 or with another motor) or may be static during the rotation of the filtering unit.

The debris trap may include elastic (or otherwise expendable) or non-elastic walls. It may be a bag that turns with the rotation of the filter (the entire filtering unit is removable for service). When the fine particles filter element becomes clogged (picked up by sensors) the self-cleaning arm may be activated if in an intermittent/non continuous mode. In such an event, the flow of debris may be simultaneously activated so that the cleaner/filtering unit will not 'smoke' due to unsettling of the dirt that is stuck onto the filter. The 'smoke' is a phenomenon that is prevented when a fine filter has dirt particles on it and these particles cumulatively assist with the fine filtering by reducing the nominal micron pore size. Filter may be a metallic, carbon based, paper or polymer mesh. When the pores start to eventually clog and the self-cleaning mechanism is activated without the backwash flowing of the debris then a white or grey milky dust cloud may exit the pool cleaner. The activation of a flow of debris will draw the debris and keep it inside the trap. The pool cleaner may be stationary in order to achieve an effective backwash. The rotation speed of the filtering unit may be reduced whilst the speed of an independently rotating and/or spinning cleaning element may be increased in order to achieve best backwash in the shortest time.

The debris trap may fill in with water and debris by reversing the flow of water so that it enters the pool cleaner from the outlet 14, passes through the filter screen and exits via the inlet 11 trapping all debris inside the trap. The trap may expand whilst accumulating additional dirt. Expansion may be in an outward direction depending on the limiting walls that restrict or 'sandwich' debris trap 210. As soon as the backwash procedure ends and normal cleaning cycle resumes valves 222 and 221 close and trapped water inside the trap will slowly seep out reducing the size and volume of the expanded trap.

FIG. 17 also illustrates rotating mechanism (motor 30, first gear 41 and filtering unit gear 21) that is configured to rotate the filtering unit 20 or the enclosure 105, thereby causing the cleaning element to clean an inner section of the filtering element.

FIG. 17 further illustrates a sensor and control box PCB for sensing when the filtering unit is clogged. The sensor may be a pressure sensor for sensing the pressure of fluid within the pool cleaner, may be an optical sensor, may be an ultrasound sensor, a motor or rpm activity sensor and the like. Any pool cleaner illustrated in any of the figures may include such a sensor.

The readings of the sensor may be used to trigger a self-cleaning operation.

FIG. 18 illustrates a filtering unit 222 according to an embodiment of the invention.

Filtering unit 222 includes a filter enclosure 105 that has a handle 275 for manually removing the filtering unit from the top, a fine filtering element 232, a coarse filtering element 231, a second cleaning element 252 for cleaning the coarse filtering element 232, a first cleaning element 251 for cleaning the fine cleaning element 231. In FIG. 18 the first and second cleaning elements are inverted L shaped arms. They can be replaced by any other cleaning elements. First cleaning element 251 is located within coarse filtering element 231 and second cleaning element 252 is positioned within the fine filtering element 232. FIG. 18 also shows a motor 292 that is mechanically coupled via an additional transmission mechanism to the second cleaning element 252 and may lengthen or shorten the length of the upper part of second cleaning element 252 (which may be a telescopic arm or any other variable length arrangement). The additional transmission mechanism may include a pinion gear and a rack.

The filtering unit or the enclosure 105 is rotated by gear 281 that meshes with additional gear 282 positioned below the filter enclosure 105.

Impeller blades 202 that are connected to the filtering unit are rotated with the rotation of the filtering unit or enclosure 105. An apertured cylinder or core 203 (with large apertures 204) is positioned at the center of filter enclosure 105. The apertured cylinder or core 203 may be static, rotate with the rotation of the filtering unit or enclosure 105 and/or rotate independently from the rotation of the filtering unit or filter enclosure 105. Axle 276 is connected to the top of apertured cylinder 203 and may be static or rotate (for example by movement element 292 of FIG. 18 that also rotates impeller 110 that is external to the filtering unit).

The resulting outcome of any of the above configurations is such that the usability time of the filter is dramatically prolonged to such an extent that an automatic or manual removal of the filtering system and replacement function of the pool cleaner may not be as frequently or successively necessitated as with the present art concerning self-contained filter mechanisms in pool cleaning apparatuses.

Such self-cleaning systems provide a solution against filter mesh clogging and—in any embodiment—there will be an extension of the mean time between servicing of the pool cleaner to evacuate, remove, collected dirt and debris, to clean the filter and to provide a clean and effective filter system within the pool cleaner for extended periods of time.

FIG. 19 illustrates a filtering unit 223 according to an embodiment of the invention. It comprises a double movement element comprising a set of internal gear activated impeller blades and an additional boosting impeller 110 located externally; it is also comprising double cleaning elements, each having different arms such as for example a haired brush followed by a scraper, whereby the cleaning elements may be controlled by a control box within 101 to actuate, for example a rotating gear, that may also form part of 101 and it's control box.

Figure 20:
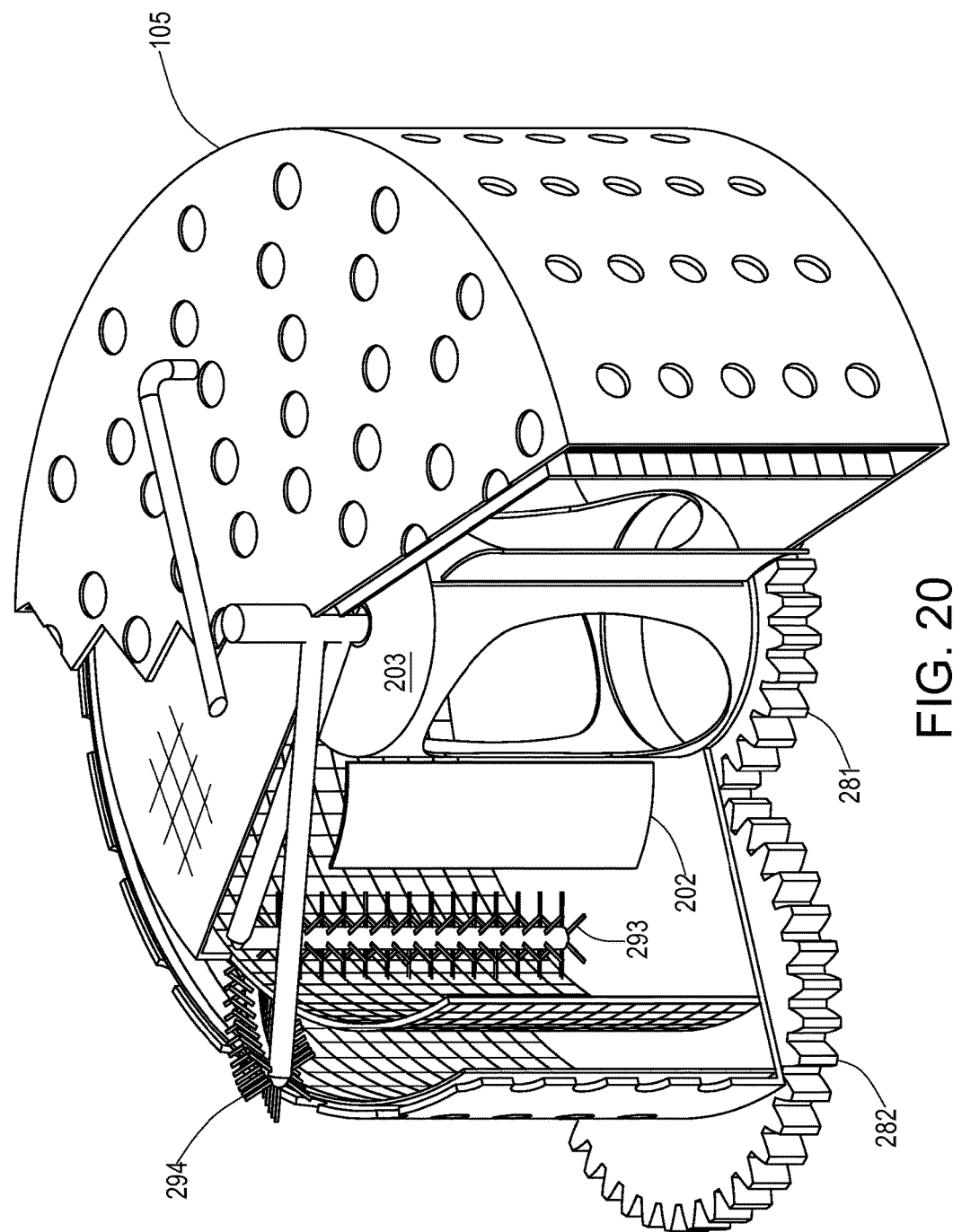
FIG. 20 illustrates a filtering unit that includes cleaning elements and a set of impeller blades according to an embodiment of the invention.

In FIG. 20 Filtering unit 223 differs from filtering unit 222 by including first and second brushes 293 and 294 instead of inverted L-shaped cleaning elements 251 and 252.

First and second brushes 293 and 294 may be manually replaced by an end user with any other cleaning elements. First brush 293 is located within coarse filtering element 231 and may clean the inner sidewall of coarse filtering element. Second brush 294 is positioned within the fine filtering element 232 and may clean the inner sidewall of fine filtering element. Second brush 294 may also clean the external sidewall of the coarse filtering element.

In FIG. 20 and/or see below FIG. 21, an end user may manually remove at least one cleaning element or a section thereof by unscrewing a securing screw(s) of an arm's section, and this may be done for any reason or for replacement of a type of cleaning element type or configuration or when replacement is required due to fair wear and tear of a cleaning element brush, rod, scrapper or even an arm.

It is noted that having a coarse filtering element and a fine filtering element is merely a non-limiting example of two filtering elements. Thus, any filtering unit that includes a coarse and a fine filtering elements may include any two filtering elements. Including filtering elements of the same filtering level.

Figure 21:
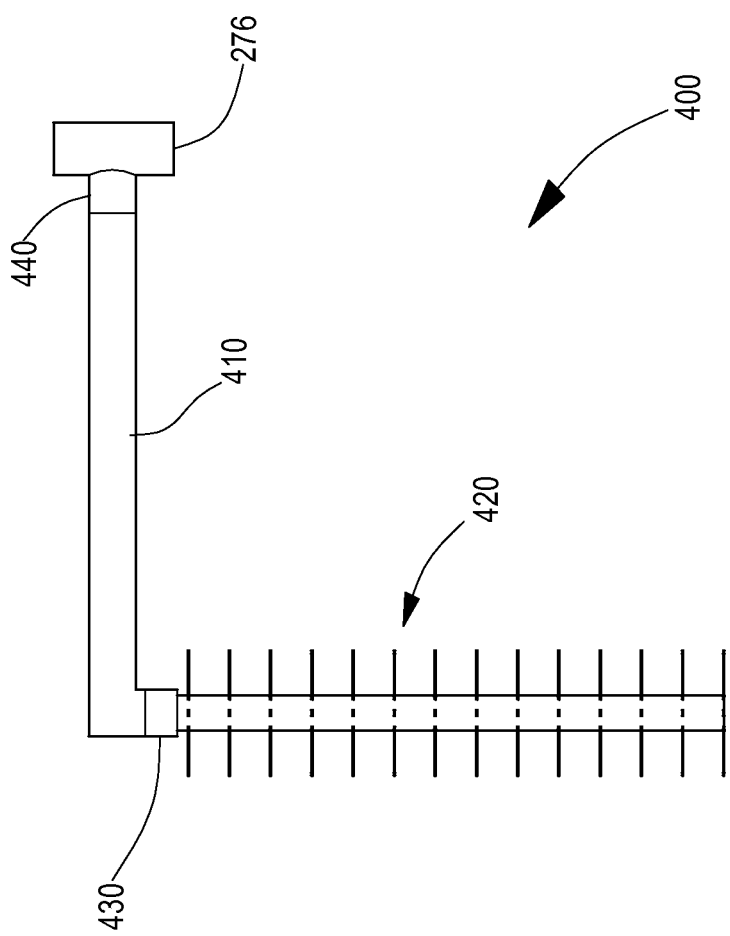
FIG. 21 illustrates cleaning element according to an embodiment of the invention.

FIG. 21 illustrates a pool cleaner according to an embodiment of the invention.

The pool cleaner may not include a cleaning element but imposes a rotation of the filtering element to clean the filtering element. The filtering element is shaped as a cone, or an inverter cone (but may have other shapes) and the rotating mechanism (such as motor and transmission mechanism) is configured to introduce a relative rotation between the filtering element and the housing thereby causing debris to be detaches from the filtering element.

The filtering element may have a radial symmetry and has a cross section that is not parallel to an axis of rotation of the relative rotation.

Yet according to another embodiment of the invention the pool cleaner of FIG. 21 may have a cleaning element, that is shaped to fit the shape of the filtering element.

It is noted that although FIGS. 1-20 illustrates a cylindrical filtering element—that the filtering element may have any shape, including, but not limited to a conical shape, a staggered shape, a polygon shape, and the like.

According to an embodiment of the invention any cleaning element may be removed and/or replaced by a user. Thus each cleaning element may be detachably connected to other parts of the pool cleaning robot. Additionally or alternatively, the cleaning element may include multiple detachable parts.

FIG. 21 illustrates a cleaning element 400 according to an embodiment of the invention. Cleaning element 400 that include a supporting element such as horizontal bar 410 that is detacheably connected to axel 276 (via interfacing element 440) and to an interfacing element—such as brush 420 (via interfacing element 430). The brush 420 can be detached from bar 410 and replaced by another brush—or by another type of interfacing element. The horizontal bar 410 may be detached from axel 276 and be replaced or removed.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A pool cleaner comprising:
a drive mechanism for moving the pool cleaner;
a housing that has a first fluid opening and a second fluid opening;
a filtering unit that comprises a filter enclosure, a cleaning element and a filtering element; and
a rotating mechanism that is configured to introduce a relative rotation between the cleaning element and the filtering element thereby causing the cleaning element to clean the filtering element.

2. The pool cleaner according to claim 1 comprising a set of impeller blades that comprises at least one impeller blade; wherein the rotation of the filtering element causes the set of impeller blades to rotate thereby inducing fluid to enter through the first fluid opening.

3. The pool cleaner according to claim 2 wherein the pool cleaner does not include any impeller except the set of impeller blades.

4. The pool cleaner according to claim 1 wherein the filter enclosure comprises a filtering unit gear that meshes with the rotating mechanism; wherein the filtering unit gear is located in proximity to a bottom of the filter enclosure.

5. The pool cleaner according to claim 1 wherein the filter enclosure comprises a filtering unit gear that meshes with the rotating mechanism; wherein the filtering unit gear is located above an upper surface of the filter enclosure.

6. The pool cleaner according to claim 1 wherein the cleaning element is coupled to a movement element that is configured to rotate an interfacing portion of the cleaning element; wherein the interfacing portion is configured to interface with an inner section of the filtering element during a cleaning of the inner section of the filtering element.

7. The pool cleaner according to claim 6 wherein the movement element is configured to rotate the interfacing portion of the cleaning element about an axis that is closer to a sidewall of the filtering element than to a center of the cleaning element.

8. The pool cleaner according to claim 6 wherein the movement element is configured to rotate the interfacing portion of the cleaning element about an axis that is proximate to a sidewall of the filtering element.

9. The pool cleaner according to claim 6 wherein the movement element is configured to rotate the interfacing portion of the cleaning element about an axis; wherein at least an upper portion of the axis is positioned above the filtering element; wherein the filtering element defines a gap that is at least partially sealed by a sealing element; wherein the axis passes through the sealing element.

10. The pool cleaner according to claim 9 wherein the sealing element has an annular shape.

11. The pool cleaner according to claim 6 wherein the interfacing portion is connected to an arm; wherein the interfacing portion is supported by the arm.

12. The pool cleaner according to claim 6 wherein the movement element belongs to the rotating mechanism.

13. The pool cleaner according to claim 6 wherein the movement element is mechanically coupled to the rotating mechanism.

14. The pool cleaner according to claim 6 wherein the movement element is positioned within the filter enclosure.

15. The pool cleaner according to claim 6 wherein the movement element is positioned outside the filter enclosure.

16. The pool cleaner according to claim 1 wherein the cleaning element comprises a vertical portion that interfaces with a sidewall of the filtering element.

17. The pool cleaner according to claim 1 wherein the cleaning element is positioned at a fixed position during a cleaning of the inner section of the filtering element.

18. The pool cleaner according to claim 1 wherein the cleaning element comprises an interfacing portion for interfacing with an inner section of the filtering element, wherein the interfacing portion is coupled to a movement element that is configured to move the interfacing portion in relation to the cleaning element thereby changing a distance between the interfacing portion and the filtering element.

19. The pool cleaner according to claim 1 wherein the cleaning element comprises an interfacing portion that is coupled to a movement element; wherein the movement element is configured to move the interfacing portion between a first position in which the interfacing element interfaces with an inner section of the filtering element and a second position in which the interfacing element is spaced apart from the inner section of the filtering element.

20. The pool cleaner according to claim 1 that comprises multiple filtering elements and multiple cleaning elements for cleaning the multiple filtering elements, wherein the multiple filtering elements comprise the filtering element and at least one additional filtering element; wherein the multiple cleaning elements comprise the cleaning element and at least one additional cleaning element.

21. The pool cleaner according to claim 20 wherein a spatial relationship between at least a pair of cleaning elements of the multiple cleaning elements remains unchanged.

22. The pool cleaner according to claim 1 wherein the cleaning element comprises an arm that comprises a supporting element and an interfacing portion; wherein the interfacing portion is configured to interface the inner section of the filtering element when cleaning the filtering element.

23. The pool cleaner according to claim 1 wherein the cleaning element comprises a rod and alternating fins that are connected to the rod; wherein the rod is configured to rotate about a longitudinal axis of the rod when cleaning the filtering element.

24. The pool cleaner according to claim 1 wherein the cleaning element comprises a brush that is parallel to a sidewall of the filtering element.

25. The pool cleaner according to claim 1 wherein the cleaning element comprises a brush that is oriented in relation to a sidewall of the filtering element.

26. The pool cleaner according to claim 1 wherein the cleaning element comprises a brush that is configured to interface with a sidewall and a bottom of the filtering element.

27. The pool cleaner according to claim 1 wherein the filtering unit is radially symmetrical and wherein the first fluid opening is positioned at a center of the filtering unit.

28. The pool cleaner according to claim 1 comprising a hydraulic system that is configured to direct fluid from the first fluid opening towards the second fluid opening; wherein the rotating mechanism and the hydraulic system share a motor.

29. The pool cleaner according to claim 1, wherein the cleaning element comprises a cleaning element core and an interfacing portion that extends from the cleaning element core and interfaces with the filtering element; wherein the cleaning element core comprises multiple cleaning element core apertures; wherein the filtering element is configured to filter fluid that enters via the first fluid opening, passes through the multiple cleaning element core apertures and exits through the second fluid opening; and wherein the rotating mechanism is configured to rotate the cleaning element core.

30. The pool cleaner according to claim 29 wherein the rotating mechanism is configured to simultaneously rotate the filtering element and the cleaning element core.

31. The pool cleaner according to claim 29 wherein the rotating mechanism is configured to rotate the filtering element and the cleaning element core in a mutual independent manner.

32. The pool cleaner according to claim 29 wherein the interfacing portion comprises multiple bristles.

33. The pool cleaner according to claim 32 wherein the multiple bristles are positioned along a spiral path.

34. The pool cleaner according to claim 29 wherein the interfacing portion comprises a continuous spiral element.

35. The pool cleaner according to claim 29 wherein the interfacing portion comprises a non-continuous spiral element.

* * * * *